(12) United States Patent
Kale et al.

(10) Patent No.: US 12,096,708 B2
(45) Date of Patent: Sep. 24, 2024

(54) AUTOMATIC GUIDANCE ASSIST SYSTEM USING GROUND PATTERN SENSORS

(71) Applicant: Deere & Company, Moline, IL (US)

(72) Inventors: Mandar M. Kale, Pune (IN); Rahul Gunda, Pune (IN); Kapil Patil, Pune (IN)

(73) Assignee: Deere & Company, Moline, IL (US)

( * ) Notice: Subject to any disclaimer, the term of this patent is extended or adjusted under 35 U.S.C. 154(b) by 135 days.

(21) Appl. No.: 17/316,159

(22) Filed: May 10, 2021

(65) Prior Publication Data

US 2022/0354044 A1 Nov. 10, 2022

(51) Int. Cl.
*A01B 69/04* (2006.01)
*G05D 1/00* (2024.01)

(52) U.S. Cl.
CPC ......... *A01B 69/008* (2013.01); *G05D 1/0038* (2013.01); *G05D 1/0255* (2013.01); *G05D 1/027* (2013.01)

(58) Field of Classification Search
CPC .. A01B 69/008; G05D 1/0038; G05D 1/0255; G05D 1/027; G05D 2201/0201
See application file for complete search history.

(56) References Cited

U.S. PATENT DOCUMENTS

| | | | | |
|---|---|---|---|---|
| 3,881,353 A | * | 5/1975 | Fathauer | G01P 13/0006 377/6 |
| 4,825,957 A | | 5/1989 | White et al. | |
| 4,835,691 A | * | 5/1989 | Rotem | A01B 69/004 172/6 |
| 5,031,704 A | * | 7/1991 | Fleischer | A01B 69/004 180/401 |
| 5,410,479 A | * | 4/1995 | Coker | G05D 1/0255 340/901 |

(Continued)

FOREIGN PATENT DOCUMENTS

| | | |
|---|---|---|
| CA | 3031105 A | 1/2018 |
| CN | 105830863 A | 8/2016 |

(Continued)

OTHER PUBLICATIONS

Extended European Search Report and Written Opinion issued in European Patent Application No. 22172294.5, dated Oct. 28, 2022, in 06 pages.

*Primary Examiner* — Abdalla A Khaled
(74) *Attorney, Agent, or Firm* — Tucker Ellis LLP

(57) ABSTRACT

An automatic guidance system is adapted to be mounted on a work vehicle such as a farm tractor for assisting an operator steer the vehicle on a desired track relative to a furrow. The system includes sensors for transmitting and receiving ultrasonic ranging signals. The sensors are ultrasound transducers mountable on ends of a planter drawn by the vehicle for directing ranging signals downwardly toward field adjacent of a furrow such that the ranging signals strike the field or furrow and are reflected back into the respective sensor. Guidance logic stored in a memory of a controller is executed by a processor to determine tractor headway direction and headland turning directions representative of desired tractor headway and headland turning directions, and a human interface device generates guidance images viewable by an operator for steering the tractor relative to furrows in the field and in the headland.

18 Claims, 13 Drawing Sheets

(56) References Cited

U.S. PATENT DOCUMENTS

| | | | |
|---|---|---|---|
| 5,573,070 A | | 11/1996 | Meek et al. |
| 5,606,504 A | * | 2/1997 | Andersen ............ A01D 41/1278 |
| | | | 702/171 |
| 5,664,632 A | * | 9/1997 | Frasier ................. A01B 59/062 |
| | | | 180/401 |
| 6,070,539 A | * | 6/2000 | Flamme .............. A01M 7/0089 |
| | | | 701/50 |
| 2009/0192654 A1 | | 7/2009 | Wendte et al. |
| 2010/0006308 A1 | * | 1/2010 | Schmidt .............. A01B 69/004 |
| | | | 172/1 |
| 2014/0379228 A1 | * | 12/2014 | Batcheller ............. A01B 76/00 |
| | | | 701/50 |
| 2016/0044858 A1 | * | 2/2016 | Johnson ................ G05B 15/02 |
| | | | 701/50 |
| 2017/0355264 A1 | * | 12/2017 | Foster .................... B60K 35/10 |
| 2020/0221635 A1 | * | 7/2020 | Hendrickson ........ A01D 41/127 |
| 2021/0112698 A1 | * | 4/2021 | Ekhe .................... A01B 79/005 |
| 2021/0120727 A1 | * | 4/2021 | Sathe .................... A01D 67/005 |
| 2022/0078961 A1 | * | 3/2022 | Kraus ....................... G06T 5/50 |
| 2022/0078963 A1 | * | 3/2022 | White .................... B60K 35/28 |
| 2022/0248589 A1 | * | 8/2022 | Davern .................. G01S 13/56 |

FOREIGN PATENT DOCUMENTS

| | | |
|---|---|---|
| CN | 105900655 A | 8/2016 |
| CN | 107278452 A | 10/2017 |
| CN | 107409554 A | 12/2017 |
| CN | 107690908 A1 | 2/2018 |
| DE | 3636063 A1 | 4/1988 |
| DE | 19509243 A1 | 9/1996 |

\* cited by examiner

AUTOMATIC GUIDANCE ASSIST SYSTEM USING GROUND PATTERN SENSORS

FIELD OF THE DISCLOSURE

The present disclosure relates to automated guidance systems and methods for assisting in maintaining a predetermined path of an apparatus relative to ground patterns such as crop rows, furrows, soil transition patterns, ground or floor color transition patterns, or the like. Although the embodiments herein will be described as used in an agricultural application providing automatic guidance assistance in a farm tractor pulling a seeder relative to a furrow, it is to be appreciated that the embodiments also relate to self-propelled apparatus and other apparatus that are towed, and have broader application including for example in commercial, construction, or industrial applications or other agricultural applications and anywhere there is a need to guide or help to guide or otherwise navigate an implement or other working tool or apparatus relative to a feature or pattern in or on the ground, floor, or other surface.

BACKGROUND

Mechanical row markers tipped with disc-type tools have been used in planter machines, seeders, and other apparatus having similar or equivalent functionality, to scribe mark furrows in the ground running in parallel with and spaced apart from an end-most seeded furrow left behind by the planter machine as it is operated through a field. The row markers are selectively extendable from opposite sides of the planter machine by a distance from the outermost ends of the planter machine that is set to be one half of the full width of the planter machine and scribe a line during work passes. Thereafter, the implement may be operated atop the marker furrows made during the previous seeding pass to follow it for oppositely-directed planting passes in the field, thereby preventing planting gaps and overlapping planted rows of seed.

Techniques using mechanical row markers that scribe mark furrows are especially handy when following winding contours in the field such as along meandering rivers or streams, around obstructions such as stands of trees, and other natural or man-made obstacles or the like.

The row markers are typically jointed and/or pivotable mechanisms that are individually mechanically operated using hydraulics or the like. They may be selectively folded out of the way when not in use such as during transport of the seeder and also during operation when they are on the side of the planter machine adjacent the portion of the field having already been planted. They may also be selectively unfolded into service to extend from the planter machine and into engagement with the ground on the side of the planter machine adjacent the portion of the field having yet to be planted. Since the row markers are used to scribe mark furrows for use in forward motion alignment in the next upcoming pass, only the right row marker is used when planting before a planned right hand turn in the field headlands and, conversely, only the left row marker is used when making a seeding pass immediately before a planned left hand turn in the field headlands.

Row marker technology has met with some success. However, row markers are costly and bulky. As would be understood, wider seeders require longer row markers because the marker and seeder dimensions need to be matched so that the working implement can follow the marker row without the seeder operation overlapping previous operations. This leads to a larger and therefore heavy marker mechanism for larger seeders, and also leads to possible control issues owing the mass and overall span of the working apparatus. Large mechanical row marker systems are also more prone to being damaged due to their unwieldiness.

In further addition, although the disc-type tools at the ends of the mechanical row markers make furrows, they are empty marker patterns and as such are non-productive since they are not used for planting seed or depositing materials such as fertilizer or the like, wherein the energy applied to this type of furrowing is essentially wasted relative to the seeding operation itself.

In addition, the use of mechanical row markers on opposite sides of the seeder machine requires the operator to remember the planting and headland turning sequence.

It is therefore desirable to provide a guidance assist system that replaces mechanical row markers with an apparatus or system that conserves energy by forgoing the need to generate physical non-productive empty marker patterns, that can detect ground patterns such as seeded or fertilized furrows, and that does not have the mechanical complexity and bulk associated with the mechanical row markers that have previously been available.

SUMMARY

The embodiments herein provide an automatic guidance assist system and method that replaces the previous inefficient, mechanically complicated, and hard to operate row markers having pivotable arms extendable from the lateral ends of a working boom with efficient, uncomplicated and easy to use mounted transducers disposed at the ends of the working boom, wherein the transducers are coupled with a controller for detecting ground patterns such as crop rows, furrows, soil transition patterns, or the like. The automatic guidance assist system and method herein provides efficiency and ease of use without the mechanical complexity and bulk associated with the previously available mechanical row marker devices.

In accordance with an example embodiment, an automatic guidance assist system is provided for assisting guiding an implement of an associated work vehicle as the implement is moved in a forward direction along a desired track relative to a furrow. The automatic guidance assist system is usable with an associated work vehicle that includes a tractor towing an implement in a forward direction along a desired track relative to a furrow. The automatic guidance assist system is equivalently usable with an associated self-propelled work vehicle that includes an integrated implement wherein movement of the self-propelled work vehicle carries the implement in a forward direction along a desired track relative to a furrow. The automatic guidance assist system is equivalently usable with self-propelled implements of any type that are movable in a forward direction along a desired track relative to a furrow.

In accordance with an example embodiment, an automatic guidance assist system includes a set of transducers operable to produce a variable output signal related to a condition of field adjacent to the furrow, and a controller operatively coupled with the set of transducers. The controller includes a processor, a memory device, and guidance assistance logic stored in the memory device. The guidance assistance logic is executable by the processor to determine a headway direction based on the variable output signal, wherein the headway direction is representative of a direction to direct or otherwise steer the implement moving in the forward direction to guide the implement along the desired track relative to the furrow. The guidance assistance logic is further executable by the processor to generate a headway signal representative of the determined headway direction.

In accordance with an aspect, the headway signal is representative of a direction to move an implement in a direction to move the implement along a desired track relative to the furrow.

In accordance with an aspect, the headway signal is usable by one or more steering control systems to guide the implement moving in the forward direction to move the implement along the desired track relative to the furrow.

In accordance with an aspect, the headway signal is an implement headway signal representative of a direction to steer a self-propelled implement moving in the forward direction to move the implement along the desired track relative to the furrow.

In accordance with an aspect, the headway signal is an implement headway control signal usable by one or more control systems of a self-propelled implement to steer the implement moving in the forward direction to move the implement along the desired track relative to the furrow.

In accordance with an aspect, the headway signal is a tractor headway signal representative of a direction to steer a tractor towing an implement moving in the forward direction to move the implement along the desired track relative to the furrow.

In accordance with an aspect, the headway signal is a tractor headway control signal usable by one or more control systems of a tractor towing an implement to steer the tractor in order to move the implement along the desired track relative to the furrow.

In accordance with an example embodiment, an automatic guidance assist system is provided for use a tractor pulling an implement. The system includes a set of transducers, a controller operatively coupled with the set of transducers, and a human interface device configured to generate a visual guidance image, wherein the visual guidance image may be used by an operator to help steer the tractor relative to a ground pattern such as a crop row, a furrow, a soil transition pattern, or the like. The set of transducers is operative to produce a variable output signal related to a condition of the field adjacent to the crop row, furrow, soil transition pattern, or the like. The controller is operatively coupled with the transducers, and includes a processor, a memory device operatively coupled with the processor, and guidance logic stored in the memory device. The guidance logic is executable by the processor to determine a tractor headway direction based on the variable output signal received by the controller from the set of transducers, wherein the tractor headway direction is representative of a direction to steer the tractor moving in the forward direction to tow the implement coupled to the tractor along the desired track relative to the crop row, furrow, soil transition pattern, or the like. The guidance logic is further executable by the processor to generate a tractor headway signal representative of the tractor headway direction. Also in the example embodiment the human interface device receives the tractor headway signal from the controller, and it includes a human readable display for generating a guidance image viewable by the operator in the tractor representative of the tractor headway signal.

In accordance with an example embodiment, the automatic guidance system includes a mounting system configured to attach with an implement of an associated combination work vehicle including the implement and a tractor pulling the implement, a set of transducers including a plurality of transducers coupled with the mounting system, a controller operatively coupled with the plurality of transducers, and a human interface device configured to generate a visual guidance image that may be used by an operator to help steer the tractor relative to ground patterns such as crop rows, furrows, soil transition patterns, or the like. Each of the plurality of transducers is operative to produce a variable ranging output signal proportional to a distance between the respective transducer and field adjacent to the furrow. The controller is operatively coupled with the plurality of transducers, and includes a processor, a memory device operatively coupled with the processor, and guidance logic stored in the memory device. The guidance logic is executable by the processor to determine a tractor headway direction based on the plurality of variable ranging output signals received by the controller from the plurality of transducers, wherein the tractor headway direction is representative of a direction to steer the tractor moving in the forward direction to tow the implement coupled to the tractor along the desired track relative to the furrow. The guidance logic is further executable by the processor to generate a tractor headway signal representative of the tractor headway direction. Also in the example embodiment the human interface device receives the tractor headway signal from the controller, and it includes a human readable display for generating a guidance image viewable by the operator in the tractor representative of the tractor headway signal.

In accordance with an example embodiment, the automatic guidance assist system includes a mounting system configured to attach with the implement of the associated combination work vehicle, wherein the mounting system includes a main frame member including a boom attachment portion configured to attach the mounting system with an implement boom of the associated implement of the combination work vehicle, and a transducer attachment portion configured to couple the set of transducers with the mounting system in a mutually spaced apart relationship relative to each other along a transverse axis. In the example embodiment the transverse axis and the forward direction of the moving tractor are substantially mutually perpendicular.

In accordance with an example embodiment, the automatic guidance assist system includes a set of transducers including a plurality of ultrasound transducers arranged on a mounting system in a matrix having rows of ultrasound transducers spanning the furrow behind the tractor of the associated combination work vehicle moving in the forward direction, and columns of ultrasound transducers on opposite sides of the furrow behind the tractor of the associated combination work vehicle moving in the forward direction.

In accordance with an example embodiment, the automatic guidance assist system includes a mounting system including a main frame member including a boom attachment portion configured to attach the mounting system with an implement boom of the associated implement of the combination work vehicle, a first transducer attachment portion configured to couple ultrasound transducers with the mounting system mutually spaced apart relative to each other along a first transverse axis, and a second transducer attachment portion offset from the first transducer attachment portion in the forward direction, wherein the second transducer attachment portion is configured to couple the third and fourth ultrasound transducers with the mounting system mutually spaced apart relative to each other along a second transverse axis. In accordance with the example embodiment, the first and second transverse axes are substantially mutually parallel, the first transverse axis and the forward direction of the moving tractor are substantially mutually perpendicular, and the second transverse axis and the forward direction of the moving tractor are substantially mutually perpendicular.

In accordance with an example embodiment, the automatic guidance assist system includes an inertial measurement unit disposed on an associated implement and connected with an input and output interface of a controller, wherein the inertial measurement unit generates an inertia signal representative of a movement of the implement. The automatic guidance assist system further includes a human interface device including a human readable display for generating a headland turning guidance image viewable by the operator in the tractor representative of the tractor headland turn path for navigating a turn in a headland of a field for rejoining an implement with a desired track relative to furrows having previously been processed.

In accordance with an embodiment, an automatic guidance assist method is provided for assisting guiding an implement of an associated work vehicle as the implement is moved in a forward direction along a desired track relative to a furrow. The automatic guidance assist method includes producing, by a set of transducers, a variable output signal related to a condition of field adjacent to the furrow. The automatic guidance assist method further includes executing, by a processor of a controller operatively coupled with the set of transducers, guidance assistance logic stored in a memory device of the controller to determine a headway direction based on the variable output signal produced by the set of transducers, wherein the headway direction is representative of a direction to direct the implement moving in the forward direction to guide the implement along the desired track relative to the furrow. The automatic guidance assist method further includes executing the guidance assistance logic to generate a headway signal representative of the determined headway direction.

In accordance with an aspect of the automatic guidance assist method, a guidance image is generated, in response to the headway signal, on a human readable display of a human interface device operatively coupled with the controller, wherein the guidance image is viewable by an operator of the associated work vehicle and is representative of the headway signal for assisting the operator visualize the headway signal for steering the associated work vehicle to guide the implement along the desired track relative to the furrow.

In accordance with an aspect of the automatic guidance assist method, a guidance signal is generated, in response to the headway signal, on a machine interface device operatively coupled with the controller, wherein the guidance signal is representative of the headway signal and is usable to automatically steer the associated work vehicle to move the implement along the desired track relative to the furrow.

BRIEF DESCRIPTION OF THE DRAWINGS

In the accompanying drawings which are incorporated in and constitute a part of the specification, example embodiments of the invention are illustrated, which, together with a general description of the invention given above, and the detailed description given below, serve to exemplify the example embodiments of the claimed invention.

DETAILED DESCRIPTION

The following describes one or more example embodiments of the disclosed automatic guidance system using ultrasonic furrow sensors, as shown in the accompanying figures of the drawings described briefly above. Various modifications to the example embodiments may be contemplated by one of skill in the art. For example, embodiments of the automatic guidance system may be used with implements that are self-propelled. In addition, embodiments of the automatic guidance system may be used with implements that are towed by an associated tractor. In further addition, embodiments of the automatic guidance system may be used with implements that are moved through a field using any motion generating mechanism or means that are now known or hereinafter developed.

Figure 1:
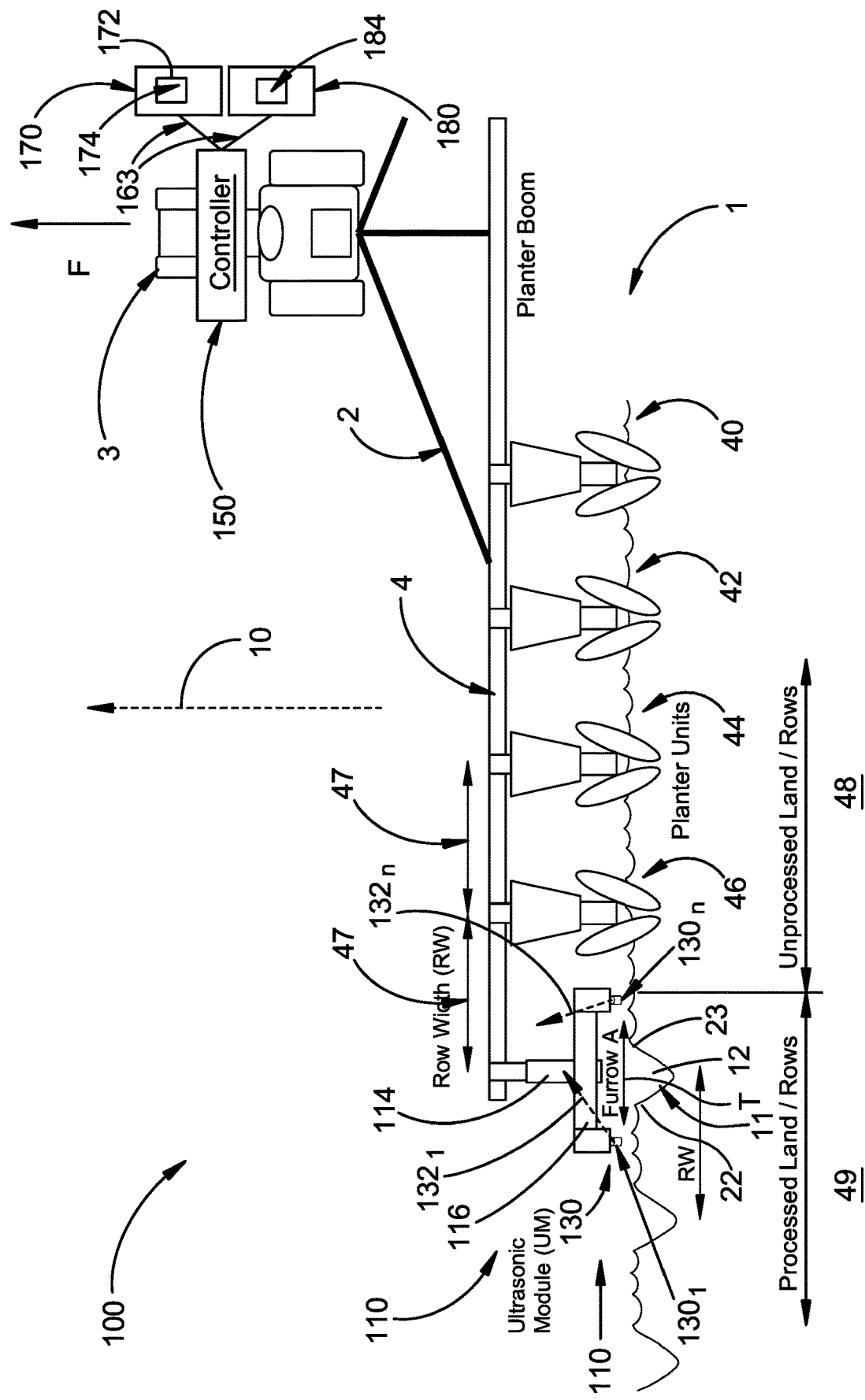
FIG. 1 is a schematic illustration of an automatic guidance system in accordance with an example embodiment mountable on an associated combination work vehicle including an implement coupled to a tractor.

FIG. 1 is a schematic illustration of an automatic guidance system 100 in accordance with an example embodiment. The automatic guidance assist system 100 assists guiding an implement 2 of an associated work vehicle 1 as the implement 2 is moved in a forward direction F along a desired track 10 relative to a furrow 12. As noted above, the automatic guidance assist system 100 associated work vehicle 1 may be used with implements 2 that are moved through a field using any motion generating mechanism or means that are now known or hereinafter developed including for example a self-propelled implement (not shown) or an implement that is towed by an associated tractor 3 as illustrated in the example embodiment. The automatic guidance assist system 100 of the example embodiment includes a set of transducers 130 operable to produce a variable output signal 132 related to a condition of field 13 adjacent to a furrow 12, and a controller 150 operatively coupled with the set of transducers 130. The controller 150 includes a processor 152 (FIG. 4), a memory device 154 and guidance assistance logic 156 stored in the memory device 154. The guidance assistance logic 156 is executable by the processor 152 to determine a headway direction 160 (FIG. 5) based on the variable output signal 132, wherein the headway direction 160 is representative of a direction D (FIG. 5) to direct or otherwise steer the implement 2 moving in the forward direction F to guide the implement 2 along the desired track 10 relative to the furrow 12. The guidance assistance logic 156 is further executable by the processor 152 to generate a headway signal 163 representative of the determined headway direction 160.

In an embodiment, the automatic guidance assist system 100 includes a human interface device 170 operatively coupled with the controller 150. The human interface device 170 includes a human readable display 172 operable to generate based on the headway signal 163 a guidance image 174 viewable by an operator of the associated work vehicle 1. The guidance image 174 is representative of the headway signal 163 for assisting the operator visualize the headway signal 163 for steering the associated work vehicle 1 and, in particular, the associated tractor 3, to move the implement 2 along the desired track 10 relative to the furrow 12.

In an embodiment, the automatic guidance assist system 100 includes a machine interface device 180 operatively coupled with the controller 150. The machine interface device 180 is operable to generate based on the headway signal 163 a guidance signal 184 representative of the headway signal 163. The guidance signal 184 is usable to automatically steer the associated work vehicle 1 to move the implement 2 along the desired track 10 relative to the furrow 12. In particular, in the example, embodiment, the guidance signal 184 is usable to automatically steer the associated tractor 3 portion of the associated work vehicle 1 to move the implement 2 along the desired track 10 relative to the furrow 12. In an example embodiment the guidance signal 184 is usable to automatically steer a self-propelled implement (not shown) to move the implement along the desired track 10 relative to the furrow 12. The guidance signal 184 may be in wired and/or wireless operative communication with a network of the associated work vehicle 1 such as the tractor 3 or the self-propelled implement, such as for example a Controller Area Network (CAN) of the associated work vehicle 1, and configured to generate data that is recognized by other devices on the network as being representative of steering control commands for steering the vehicle.

In an example embodiment, the guidance signal 184 may be used to directly actuate one or more control devices of the tractor or of the self-propelled implement. In a further example embodiment, the guidance signal 184 may be used to indirectly actuate one or more control devices of the tractor or of the self-propelled implement via communicating the guidance signal 184.

In an embodiment, the automatic guidance assist system 100 is mountable on an associated combination work vehicle 1 including an implement 2 coupled to a tractor 3. The automatic guidance system 100 beneficially assists an operator tow the implement 2 along a desired track 10 relative to a ground pattern 11 such as, for example, a furrow 12 behind the tractor 3 moving in a forward direction F. In an embodiment the automatic guidance system 100 beneficially generates a guidance signal 184 usable to automatically steer the associated work vehicle 1 to move the implement 2 along the desired track 10 relative to the furrow 12. The automatic guidance system 100 of the example embodiment includes a set of transducers 130, a controller 150 operatively coupled with the set of transducers 130, a human interface device 170, and a machine interface device 180. The set of transducers 130 in the example embodiment is operable to produce a variable output signal 132 (FIG. 4) related to a condition of field 13 adjacent to the furrow 12. The controller 150 of the example embodiment includes a processor 152 (FIG. 4), a memory device 154 and guidance assistance logic 156 stored in the memory device 154, wherein the guidance assistance logic stored in the memory device is executable by the processor to determine a tractor headway direction 160 (FIG. 5) based on the variable output signal 132, the tractor headway direction 160 being representative of a direction D (FIG. 5) to steer the tractor 3 moving in the forward direction F to tow the implement 2 coupled with the tractor 3 along the desired track 10 relative to the furrow 12. The guidance assistance logic stored in the memory device is further executable by the processor to generate a tractor headway signal 163 (FIG. 4) representative of the determined tractor headway direction 160. Further in the example embodiment, the human interface device 170 is operable to generate based on the tractor headway signal 163 a guidance image 174 (FIGS. 6b, 7b, 10b) representative of the tractor headway signal 163 for visually assisting the operator steer the tractor 3 to tow the implement 2 along the desired track 10 relative to the furrow 12.

The automatic guidance system 100 of the example embodiment further includes a mounting system 110 configured to attach with the implement 2 of the associated combination work vehicle 1. In the example embodiment, the mounting system 110 includes a boom attachment portion 114 configured to attach the mounting system 110 with an implement boom 4 of the associated implement 2 of the combination work vehicle 1, and a transducer attachment portion 116 configured to couple the set of transducers 130 with the mounting system 110 in a mutually spaced apart relationship relative to each other along a transverse axis T, wherein the transverse axis T and the forward direction F of the moving tractor 3 are substantially mutually perpendicular. The set of transducers 130 may be in wired and/or wireless operative communication with the controller 150.

Figure 4:
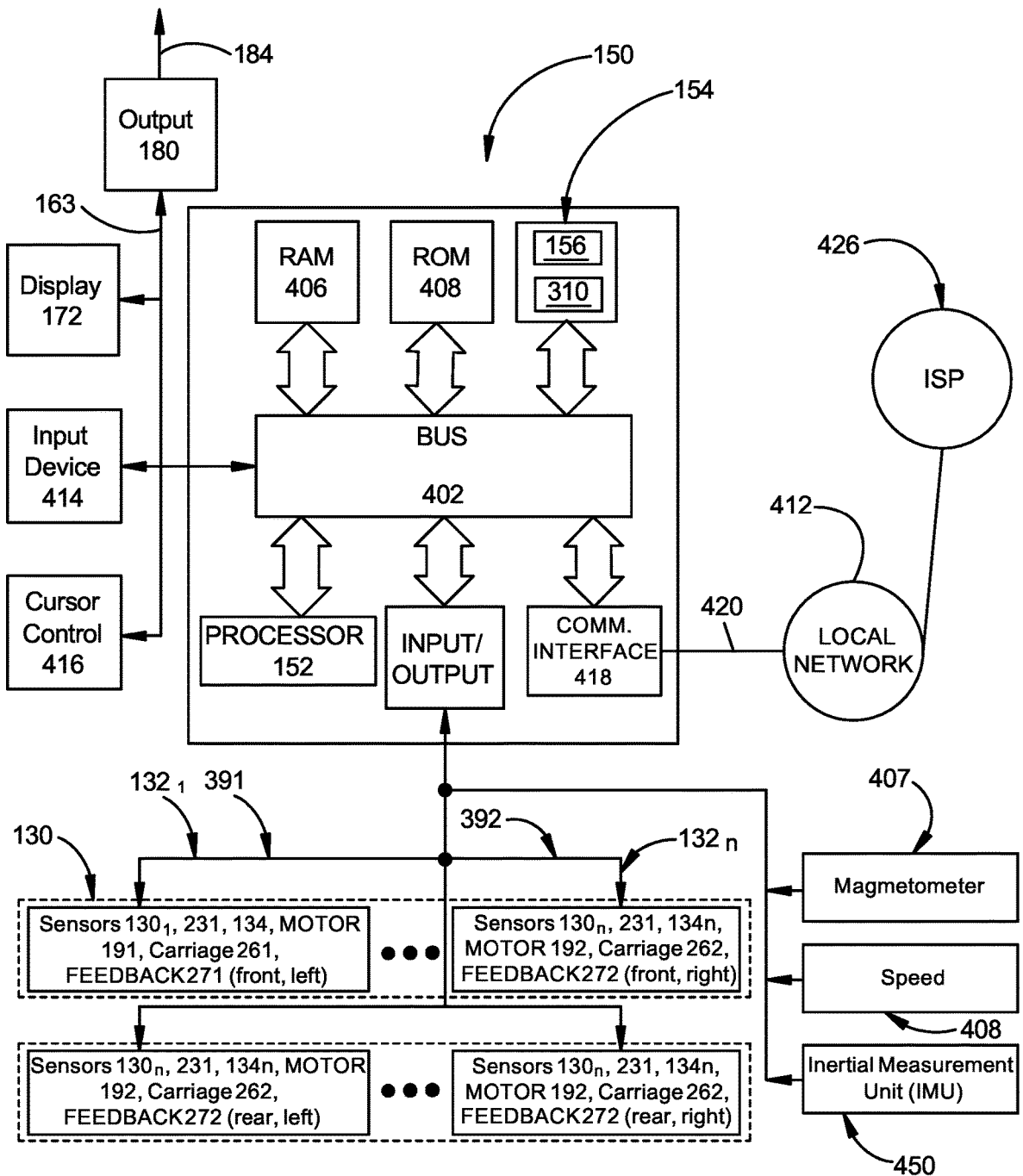
FIG. 4 is a schematic illustration of a controller portion of the automatic guidance system of the Figures in accordance with an example embodiment.

In the example embodiment, the set of sensors 130 include a plurality of transducers $130_1$-$130_n$ coupled with the mounting system 110, and the controller 150 is operatively coupled with the plurality of transducers $130_1$-$130_n$. In the example embodiment, each of the plurality of transducers $130_1$-$130_n$ is operative to produce a variable ranging output signal $132_1$-$132_n$ (FIG. 4) proportional to a distance between the respective transducer and field beneath or otherwise adjacent to the furrow 12. The controller 150 is operatively coupled with the plurality of transducers $130_1$-$130_n$, and, as shown in FIG. 4 includes a processor 152, a memory device 154 operatively coupled with the processor 152, and guidance logic 156 stored in the memory device 154. The guidance logic 156 is executable by the processor 152 to determine a tractor headway direction 160 (FIG. 5) based on the plurality of variable ranging output signals $132_1$-$132_n$ received by the controller 150 from the plurality of transducers $130_1$-$130_n$, wherein the tractor headway direction is 160 representative of a direction D (FIG. 5) to steer the tractor 3 moving in the forward direction F to tow the implement 2 coupled to the tractor 3 along the desired track 10 relative to the furrow 12. The guidance logic 156 is further executable by the processor 152 to generate a tractor headway signal 163 representative of the tractor headway direction 160. Also in the example embodiment the human interface device 170 receives the tractor headway signal 163 from the controller 150, and it includes a human readable display 172 for generating a guidance image 174 (FIGS. 6b, 7b) viewable by the operator in the tractor 3 representative of the tractor headway signal 163. The plurality of transducers $130_1$-$130_n$ may be in wired and/or wireless operative communication with the controller 150.

It is to be appreciated that in accordance with the example embodiments, the plurality of transducers $130_1$-$130_n$ may include two (2) or more transducers and may be any type of transduces that are operable to produce a variable output signal related to a condition of the field 13 adjacent to the furrow 12 and in particular that are operative to produce a variable ranging output signal $132_1$-$132_n$ proportional to a distance between the respective transducer and field 13 adjacent to the furrow 12. In an example embodiment, the plurality of transducers $130_1$-$130_n$ comprise a plurality of ultrasound transducers $134_1$-$134_n$ arranged on the mounting system 110. In a particular example, the plurality of transducers $130_1$-$130_n$ may be arranged on the mounting system 110 in an array 140 to span the furrow 12 behind the tractor 3 of the associated combination work vehicle 1 moving in the forward direction F such as shown for example in FIG. 3. In a more particular example embodiment the plurality of transducers $130_1$-$130_n$ comprise a plurality of ultrasound transducers $134_1$-$134_n$ arranged on the mounting system 110 in an array 140 (FIG. 3) to span the furrow 12 behind the tractor 3 of the associated combination work vehicle 1 moving in the forward direction F. The plurality of ultrasound transducers $134_1$-$134_n$ may be in wired and/or wireless operative communication with the controller 150.

In the example embodiment shown, the implement 2 includes planter units 40, 42, 44, 46 spaced apart on a boom 4 by equal distances setting a row width 47. The planter units operate to plant seed or the like in an unprocessed portion 48 of a field while the mounting system 110 and set of sensors 130 extend into the processed portion 49 of the field that was seeded in the most recent previous seeding pass of the combination vehicle. In this way, the new seeded furrows left behind by the planter units 40, 42, 44, 46 are in alignment with the edge furrow of the processed portion 49.

FIG. 2 is a schematic illustration of a portion of the automatic guidance system 100 of FIG. 1 in accordance with an example embodiment shown mounted on an end of an associated planter boom 4 and held adjacent to a ground pattern 11 such as, for example, a furrow 12 in a field. As shown, the mounting system 110 of the automatic guidance system 100 in the example embodiment includes a main frame member 112 including a boom attachment portion 114 configured to attach the mounting system 110 with an implement boom 4 of the associated implement 2 of the combination work vehicle 1, and a transducer attachment portion 116 configured to couple the plurality of transducers $130_1$-$130_n$ with the mounting system 110 mutually spaced apart relative to each other along a transverse axis T. In the example embodiment, the transverse axis T and the forward direction F of the moving tractor 3 are substantially mutually perpendicular. It is to be appreciated that the forward direction F of the moving tractor 3 towing the mounting system 110 attached with the implement boom 4 is into the page as viewed bit is illustrated as an upwardly directed arrow F for ease of reference and description.

The plurality of transducers $130_1$-$130_n$ may be any type of transducers for producing a signal representative of a distance and, in particular, for producing a signal representative of a distance between the transducer and the ground beneath or otherwise adjacent to the transducer. In the example embodiment, the plurality of transducers $130_1$-$130_n$ include first and second transducers 131, 132 arranged on the transducer attachment portion 116 of the mounting system 110 such that they are each on opposite sides of the ground pattern 11 such as, for example, the furrow 12. In the example embodiment, the first and second transducers 131, 132 (FIG. 2a) include first and second ultrasound transducers 231, 232 (FIG. 2b) arranged on the transducer attachment portion 116 of the mounting system 110 such that they are each on opposite sides of the ground pattern 11 such as, for example, the furrow 12. In the example embodiment, the plurality of transducers $130_1$-$130_n$ comprise a plurality of ultrasound transducers $134_1$-$134_n$ comprising the first and second ultrasound transducers 231, 232. As shown, the transducer attachment portion 116 of the mounting system 110 is configured to couple the first and second ultrasound transducers 231, 232 with the mounting system 110 in a mutually spaced apart relationship relative to each other along the transverse axis T (FIG. 1). The first ultrasound transducer 231 is operative to emit a first ranging signal 241 in a direction of field 13 adjacent to the furrow 12, to receive a first reflection 251 of the first ranging signal 241 (FIG. 2b) from the field 13, and to produce a first variable ranging output signal 161 proportional to the distance between the first ultrasound transducer 231 and the field 13 adjacent to the furrow 12. In the example embodiment, the first variable ranging output signal 161 proportional to the distance between the first ultrasound transducer 231 and the field 13 adjacent to the furrow 12 is an electrical signal shown schematically in FIG. 2b as a line directed towards the controller 150 configured to be disposed in the associated tractor 3 (not shown). Similarly, the second ultrasound transducer 232 is operative to emit a second ranging signal 242 in a direction of field 13 adjacent to the furrow 12, to receive a second reflection 252 of the second ranging signal 242 (FIG. 2b) from the field 13, and to produce a second variable ranging output signal 163 proportional to the distance between the second ultrasound transducer 232 and the field 13 adjacent to the furrow 12. Also similarly in the example embodiment, the second variable ranging output signal 163 proportional to the distance between the second ultrasound transducer 232 and the field 13 adjacent to the furrow 12 is an electrical signal shown schematically in FIGS. 2a and 2b as a line directed towards the controller 150 configured to be disposed in the associated tractor 3 (not shown).

In one example embodiment, the plurality of transducers $130_1$-$130_n$ may be automatically movable on the mounting system 110 such as by being carried by movable parts of the mounting system 110, so that they may be exercised or otherwise moved by or under the control of the controller 150 in order to find, hunt, or otherwise determine the edges of the furrow 12. In this regard and as shown in the Figures such as for example in FIGS. 2a and 2b, the transducer attachment portion 116 of the main frame member 112 includes first and second carriage devices 261, 262. The first carriage device 261 is movable on the transducer attachment portion 116 of the main frame member 112 along the transverse axis T, and is configured to operatively couple the first transducer 131 comprising for example the first ultrasound transducer 231 with the transducer attachment portion 116 of the main frame member 112. The first carriage device 261 is operated by the controller 150 to selectively carry the first ultrasound transducer 231 towards and away from the second ultrasound transducer 232 along the transverse axis T. Similarly, the second carriage device 262 is movable on the transducer attachment portion 116 of the main frame member 112 along the transverse axis T, and is configured to operatively couple the second transducer 131 comprising for example the second ultrasound transducer 232 with the transducer attachment portion 116 of the main frame member 112. The second carriage device 262 is operated by the controller 150 to selectively carry the second ultrasound transducer 232 towards and away from the first ultrasound transducer 231 along the transverse axis T. In that way, the plurality of transducers $130_1$-$130_n$ may be moved on the mounting system 110 by the controller 150 so that the controller 150 may determine the edges of the furrow 12 based on a combination of the signals received from the plurality of transducers $130_1$-$130_n$ together with signals representative of the positions of the plurality of transducers $130_1$-$130_n$ relative to the mounting system 110 and, in particular, relative to the transducer attachment portion 116 of the main frame member 112 of the mounting system 110 as the combination vehicle 1 is moved through a field.

The controller 150 of the automatic guidance system 100 may determine the positions of the carriage devices 261, 262 using one or more feedback devices such as linear scales, resolvers, or the like. In this regard, in the example embodiment, the automatic guidance system 100 includes first and second feedback devices 271, 272. The first position feedback device 271 is operatively coupled with the controller 150, and operates to generate a first position feedback signal 281 representative of a position of the first ultrasound transducer 231 on the transverse axis T. Similarly, the second position feedback device 272 operatively coupled with the controller 150, and operates to generate a second position feedback signal 282 representative of a position of the second ultrasound transducer 232 on the transverse axis T. In accordance with the example embodiments herein, the guidance logic 156 is executable by the processor 152 to determine the tractor headway direction 160 based on a combination of the first and second variable ranging output signals 261, 262 received by the controller from the first and second ultrasound transducers 231, 232, together with the first and second position feedback signals received by the controller from the first and second position feedback devices.

The first and second carriage devices 261, 262 may be movable on the transducer attachment portion 116 of the main frame member 112 along the transverse axis T, using various types of motion schemes, and in the example embodiment prime mover devices 190 may be provided for this purpose. In this regard, in the example embodiment illustrated, the prime mover devices 190 include first and second prime mover motor devices 291, 292. The first prime mover motor device 291 is operatively coupled with the controller 150, and is responsive to a first position command signal 391 received from the controller 150 to move the first carriage device 261 carrying the first ultrasound transducer 231 towards and away from the second ultrasound transducer 232 along the transverse axis T. Similarly, the second prime mover motor device 292 is operatively coupled with the controller 150, and is responsive to a second position command signal 392 received from the controller 150 to move the second carriage device 262 carrying the second ultrasound transducer 232 towards and away from the first ultrasound transducer 231 along the transverse axis T. The first and second position command signals 391, 392 are electrical signals generated by the controller 150 and are shown schematically in FIGS. 2a and 2b as line directed generally from the controller 150 and towards the first and second prime mover motor devices 291, 292. In accordance with the example embodiments herein, the guidance logic 156 is executable by the processor 152 to determine the tractor headway direction 160 based on a combination of the first and second variable ranging output signals 261, 262 received by the controller from the first and second ultrasound transducers 231, 232, together with the first and second position feedback signals received by the controller from the first and second position feedback devices as the carriages are moved to hunt for the edges of the furrow 12.

In order to hunt for the edges of the furrow 12 the controller further includes furrow detection logic 310 (FIG. 4) stored in the memory device 154. In the example embodiment, the furrow detection logic 310 is executable by the processor to locate a first edge 22 (FIG. 1) of the furrow 12 by generating the first position command signal 391 to control the first prime mover device 291 to move the first carriage device 261 carrying the first ultrasound transducer 231 along the transverse axis T based on the first variable ranging output signal generated by the first ultrasound transducer indicating a change above a predetermined threshold in the distance between the first ultrasound transducer and the field adjacent to the furrow 12. The furrow detection logic 310 is further executable by the processor to locate a second edge 23 (FIG. 1) of the furrow 12 opposite the first edge 22 by generating the second position command signal 392 to control the second prime mover device 292 to move the second carriage device 262 carrying the second ultrasound transducer 232 along the transverse axis T based on the second variable ranging output signal generated by the second ultrasound transducer indicating a change above the predetermined threshold in the distance between the second ultrasound transducer and the field adjacent to the furrow 12. In accordance with a further particular example embodiment, the furrow detection logic 310 is executable by the processor to generate a warning signal when one or more of the edges of the furrow cannot be located. The warning signal may be a visual and/or audible signal that is communicated to the operator of the tractor 3 such as by annunciation via the human interface device 170, for example. The warning signal would provide the operator with an alert that the furrow detection logic 310 was unable to locate the one or more of the edges of the furrow thereby providing the operator with the opportunity to attempt to manually adjust one or more portions of the automatic guidance assist system 100 according including for example manually adjusting the carriage devices carrying the transducers or by steering the tractor to a desired position relative to the furrow for resuming automatic furrow detection and guidance assistance operations.

Figure 3:
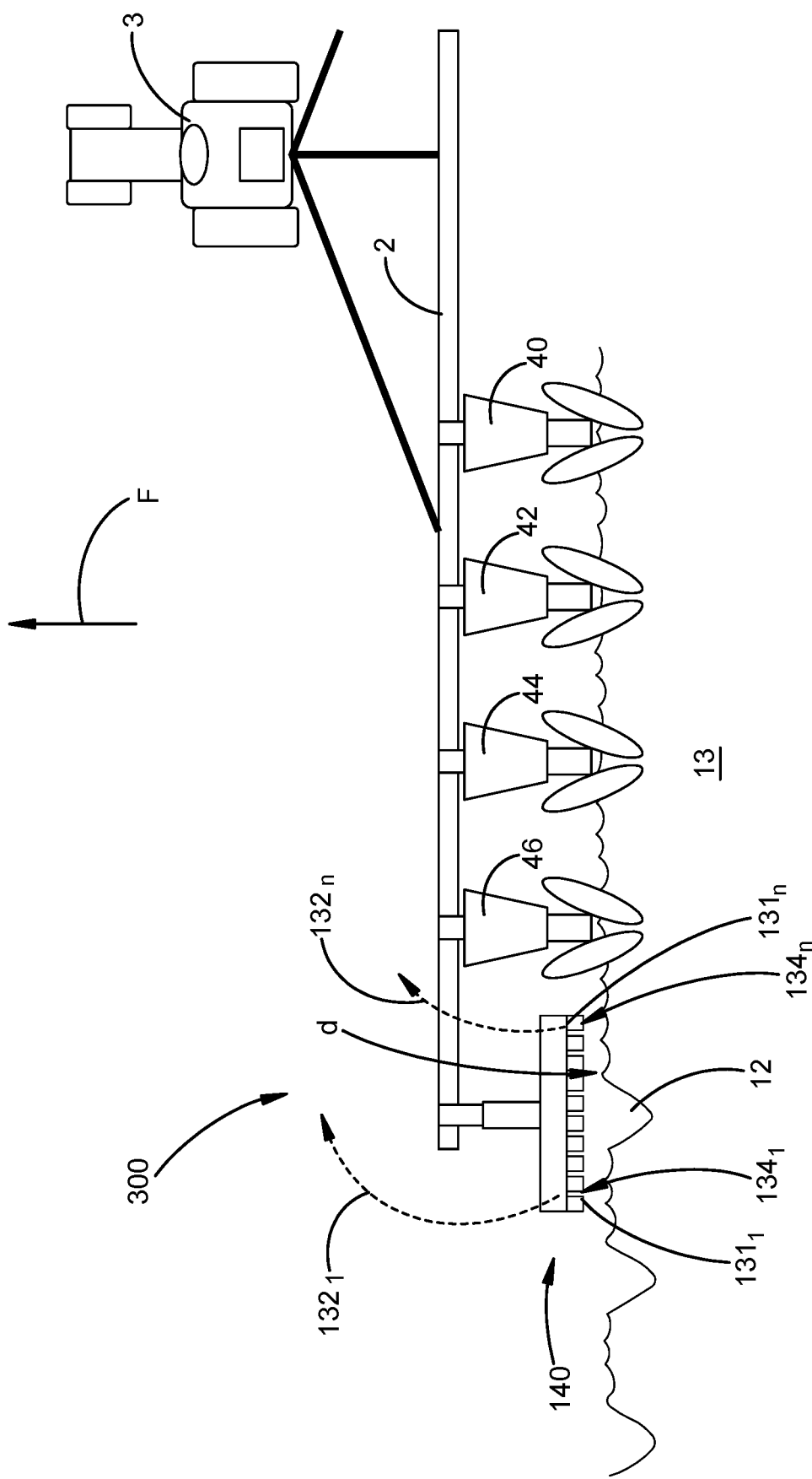
FIG. 3 is a schematic illustration of an automatic guidance system in accordance with an example embodiment mountable on an associated combination work vehicle including an implement coupled to a tractor.

In a further example embodiment such as shown in FIG. 3 for example, the plurality of transducers $130_1$-$130_n$ are arranged on the mounting system in an array 140 to span the furrow 12 behind the tractor 3 of the associated combination work vehicle 1 comprising the tractor 3 and the implement 2 moving collectively in the forward direction F. In this regard, FIG. 3 is a schematic illustration of an automatic guidance system 300 in accordance with an example embodiment mountable on an associated combination work vehicle 1 including an implement 2 coupled to a tractor 3. In the further example embodiment, the plurality of transducers $130_1$-$130_n$ comprise a plurality of ultrasound transducers $134_1$-$134_n$ arranged on the mounting system in an array 140 to span the furrow 12 behind the tractor 3 of the associated combination work vehicle 1 moving in the forward direction F.

Each of the plurality of ultrasound transducers $134_1$-$134_n$ arranged on the mounting system is operative to emit a respective ranging signal in a direction of field 13 adjacent to the furrow 12, to receive a respective reflection of the ranging signal from the field 13, and to produce a corresponding variable ranging output signal proportional to the distance d between the respective ultrasound transducer and the field 13 adjacent to the furrow 12. In the embodiment, the furrow detection logic 310 is operable to determine the location of the furrow 12 relative to the mounting system 110 based on the set of variable ranging output signals received from the plurality of ultrasound transducers 134 1-134 n arranged in the array 140. In this regard and in accordance with an example embodiment, the furrow detection logic 310 is operable to determine the location of the furrow 12 relative to the mounting system 110 based the variable ranging output signals received from a set of ultrasound transducers immediately adjacent to the furrow having a greater magnitude than others of the set of ultrasound transducers being further away from and not immediately adjacent to the furrow. In the example embodiment, the variable ranging output signals received from the set of ultrasound transducers arranged in the array 140 as shown define an electronic magnitude profile across the array of sensors that mimics or otherwise tracks the physical cross-sectional profile of the furrow in a direction transverse to the forward direction F of the moving automatic guidance system 300 mountable on the associated combination work vehicle 1. For example, the variable ranging output signals received from the ultrasound transducers immediately above the furrow generate a signal that is representative of a larger gap distance between the sensor and the bottom of the furrow 12 than the other ultrasound transducers immediately above the field 13. The magnitude of the signals from the ultrasound transducers essentially collectively generate a profile of the furrow and ground on opposite sides of the furrow in a direction transverse to the forward direction F.

FIG. 4 is a schematic illustration of a controller portion 150 of the automatic guidance system 100, 300, 800, 900 of the Figures in accordance with an example embodiment suitable for executing embodiments of one or more software systems or modules that are executable to provide an automatic guidance system that replaces mechanical row markers with transducers that can detect furrows and that do not have the mechanical complexity and bulk associated with the mechanical row markers that have previously been available.

The example computer system 150 of the embodiment includes a bus 402 or other communication mechanism for communicating information, and a processor 152 coupled with the bus for processing information. The computer system includes a main memory 154, such as may also include random access memory (RAM) 406 or other dynamic storage devices for storing information and instructions such as guidance logic 156 and furrow detection logic 310 to be executed by the processor 152, and read only memory (ROM) 408 or other static storage device for storing static information and instructions for the processor 152. The main memory may be a non-volatile memory device for example operable to store information and instructions executable by the processor 152.

The example embodiments described herein are related to the use of the computer system 154 for determining a tractor headway direction based on a plurality of variable ranging output signals received by the controller from a plurality of transducers, wherein the tractor headway direction is representative of a direction to steer the tractor moving in the forward direction to tow the implement coupled to the tractor along the desired track 10 relative to the furrow, and wherein the computer system 154 further generates a tractor headway signal representative of the tractor headway direction for use by a human interface device that receives the tractor headway signal from the controller and that includes a human readable display for generating a guidance image viewable by the operator in the tractor representative of the tractor headway signal. Further, the embodiments described herein are related to the use of computer system 152 for accessing information from the multiple sources in selective combination with internal proprietary data such as driver sensitive data, harvest records, travel data, weather data, and the like from within a firewall as may be necessary or desired. According to one implementation, information from the multiple remote public, commercial, and/or internal proprietary resources is provided by computer system 150 in response to the processor 152 executing one or more sequences of one or more instructions contained in main memory device 154. Such instructions may be read into main memory device 154 from another computer-readable medium, such as a storage device including for example a memory card. Execution of the sequences of instructions contained in main memory device 154 causes the processor 152 to perform the process steps described herein. In an alternative implementation, hard-wired circuitry may be used in place of or in combination with software instructions to implement the invention. Thus implementations of the example embodiments are not limited to any specific combination of hardware circuitry and software.

In accordance with the descriptions herein, the term "computer-readable medium" as used herein refers to any non-transitory media that participates in providing instructions to the processor 152 for execution. Such a non-transitory medium may take many forms, including but not limited to volatile and non-volatile media. Non-volatile media includes, for example, optical or magnetic disks. Volatile media includes dynamic memory for example and does not include transitory signals, carrier waves, or the like. Common forms of computer-readable media include, for example, a floppy disk, a flexible disk, hard disk, magnetic tape, or any other magnetic medium, a CD-ROM, any other optical medium, punch cards, papertape, any other physical medium with patterns of holes, a RAM, PROM, and EPROM, a FLASH-EPROM, any other memory chip or cartridge, or any other tangible non-transitory medium from which a computer can read.

In addition and further in accordance with the descriptions herein, the term "logic", as used herein with respect to the Figures, includes hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components.

The automatic guidance system computer system 150 may also include a communication interface 418 coupled to the bus 402 which provides a two-way data communication coupling to a network link 420 that is connected to local network 412. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 412 to a host computer supporting a database or the like storing internal proprietary data and/or to data equipment operated by an Internet Service Provider (ISP) 426. ISP 426 in turn may provide data communication services through the Internet. Local network 412 and Internet may both use electric, electromagnetic or optical signals that carry digital data streams. The signals through the various networks and the signals on network link 420 and through communication interface 418, which carry the digital data to and from the automatic guidance system computer system 150, are exemplary forms of carrier waves transporting the information.

The automatic guidance system computer system 150 can send messages and receive data, including program code, through the network(s), network link 420 and communication interface 418. In an Internet-connected example embodiment, the computer system 150 is operatively connected with a plurality of external public, private, governmental or commercial servers (not shown) such as one or more wireless services configured to execute a web application in accordance with the example embodiment. In the example embodiment shown, the automatic guidance system controller 150 is operative to selectively transmit a request for data to be selectively retrieved from the respective remote databases through the Internet, ISP 426, local network 412 and communication interface 418 or to receive selected data pushed from the databases, or by both means in accordance with the example embodiments. The received data is processed and executed by the processor 152 as it is received, and/or stored in storage device 154, 406, 408, or other non-volatile storage for later processing or data manipulation.

The automatic guidance system control system 150 suitably includes several subsystems or modules to perform the automatic guidance as set forth herein. A primary purpose of the subject application is to provide an improved system that replaces mechanical row markers with transducers that can detect furrows and that do not have the mechanical complexity and bulk associated with the mechanical row markers that have previously been available. Guidance logic 156 and furrow detection logic 310 stored in the memory device 154 of the controller 150 are executed by the processor 152 to determine tractor headway and headland turning directions representative of desired tractor headway and headland turning directions, and a human interface device generates guidance images on a display 172 viewable by an operator for steering the tractor relative to furrows in the field and in the headland for making turns.

Figure 2A:
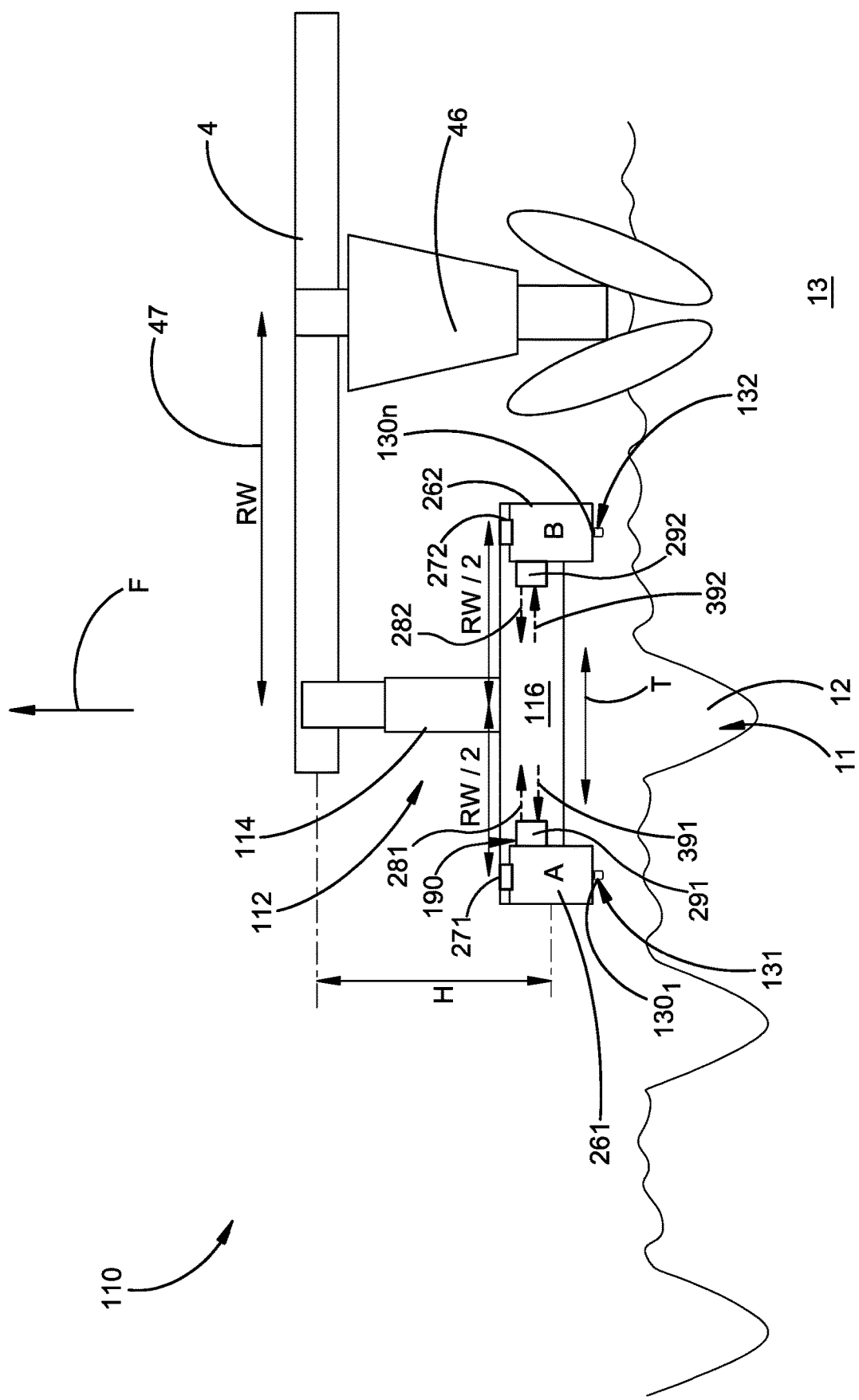
FIGS. 2a and 2b are schematic illustrations of a portion of the automatic guidance system of FIG. 1 in accordance with an example embodiment shown mounted on an end of an associated planter boom and held adjacent to a furrow in a field.
Figure 2B:
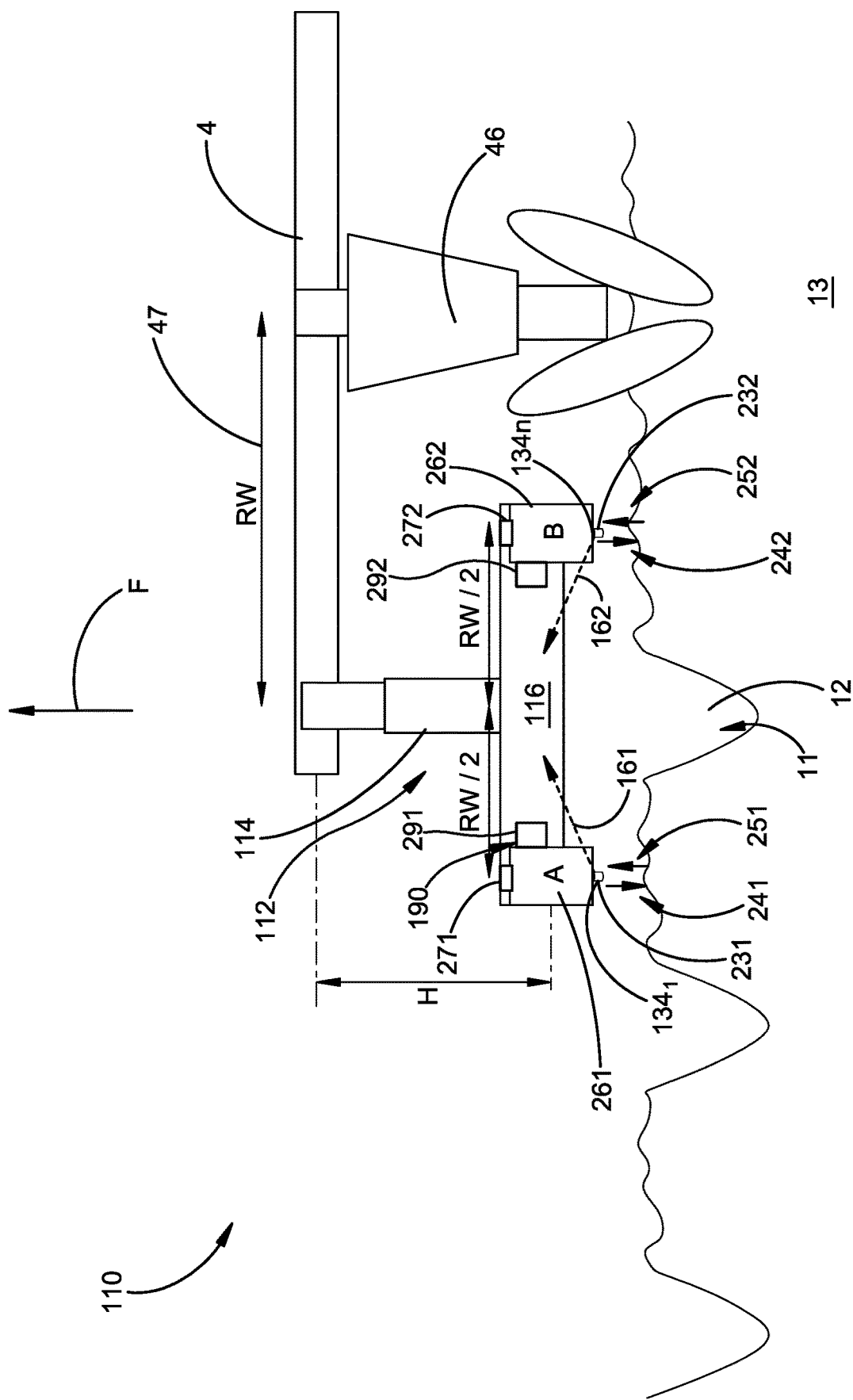
Figure 5:
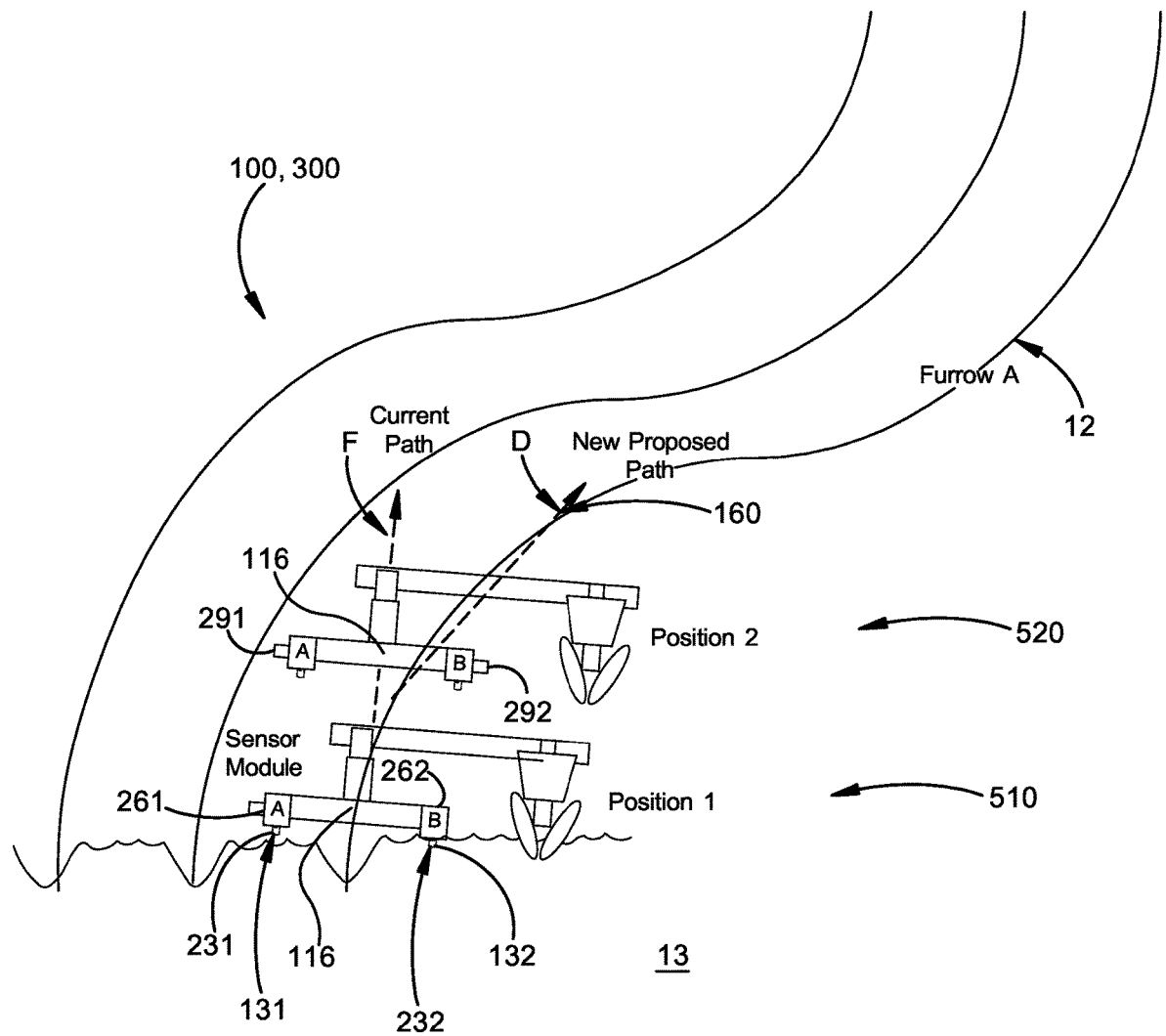
FIG. 5 is a schematic illustration of the portion of the automatic guidance system of Figure as shown in FIG. 2 and shown in use assisting an operator follow a meandering furrow in a field in accordance with an example embodiment.

FIG. 5 is a schematic illustration of a portion of an automatic guidance system 100 as shown in FIGS. 1, 2a, and 2b and shown in use for assisting an operator follow a meandering furrow 12 in a field in accordance with an example embodiment. Although the embodiment having left and right transducers 131, 132 is shown, it is to be appreciated that the plurality of transducers $130_1$-$130_n$ may equivalently comprise a plurality of ultrasound transducers $134_1$-$134_n$ arranged on the mounting system in an array 140 to span the furrow 12 behind the tractor 3 of the associated combination work vehicle 1 moving in the forward direction F. As the tractor towing the implement in a forward direction F is moved from a first position 510 to a second position 520, the rightmost transducer 132 of the automatic guidance system 100 detects a change in the observed field beneath it owing to the nature of the meandering furrow 12, wherein the rightmost transducer 132 produces a variable ranging output signal as described above that is proportional to a distance between the respective transducer and field adjacent to the furrow. The leftmost transducer 131 also produces a variable ranging output signal as described above that is proportional to a distance between the respective transducer and field adjacent to the furrow. However, since only the rightmost transducer 132 encounters the edge of the furrow 12 as the implement is moved in the forward direction F from the first position 510 to the second position 520 the variable ranging output signal of the rightmost transducer 132 changes more than the variable ranging output signal of the leftmost transducer 131. The variable ranging output signal of the leftmost transducer 131 does not change or changes less than the variable ranging output signal of the rightmost transducer 132, in the example. Preferably, in the example embodiment, the transducers 131, 132 are first and second ultrasound transducers 231, 232 as described above.

The guidance logic 156 of the controller 150 is executable by the processor to determine a tractor headway direction 160 based on the plurality of variable ranging output signals $132_1$-$132_n$ received by the controller 150 from the plurality of transducers $130_1$-$130_n$. The tractor headway direction is representative of a direction D to steer the tractor 3 moving in the forward direction F to tow the implement 2 coupled to the tractor 3 along the desired track 10 relative to the furrow 12. The controller 150 generates a tractor headway signal 163 representative of the tractor headway direction 160, and a human interface device 170 receives the tractor headway signal 163 from the controller 150. In the example embodiment, the human interface device 170 is a human readable display 172 (FIGS. 6b, 7b) for generating a guidance image 174 (FIGS. 6b, 7b) viewable by the operator in the tractor 3 representative of the tractor headway signal 163.

Figure 6A:
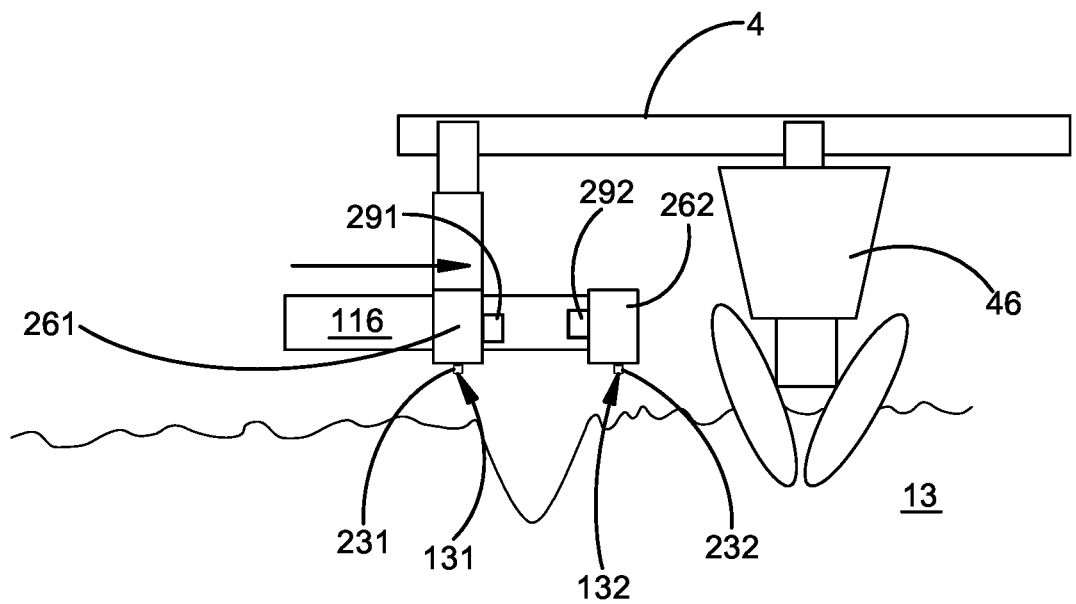
FIG. 6a is a schematic illustration of the portion of the automatic guidance system of FIG. 2 illustrating a movable sensor tracking a furrow in a field in accordance with an example embodiment.
Figure 6B:
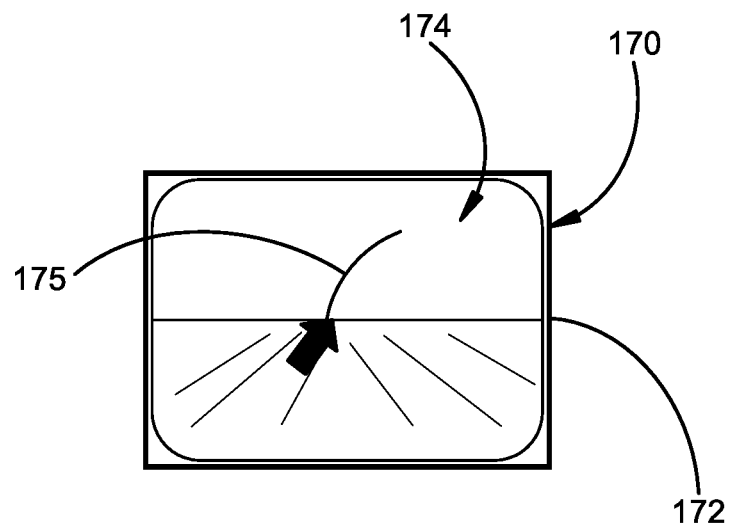
FIG. 6b is a schematic illustration of a human readable display on a human interface device providing automatic guidance for assisting an operator tow the implement along a desired track relative to the furrow shown in FIG. 6a in accordance with an example embodiment.

FIG. 6a is a schematic illustration of the portion of the automatic guidance system of FIG. 2 illustrating a movable sensor tracking a furrow in a field in accordance with an example embodiment, and FIG. 6b is a schematic illustration of a human readable display 172 on a human interface device 170 providing automatic guidance for assisting an operator tow the implement along a desired track 10 relative to the furrow shown in FIGS. 5 and 6a in accordance with an example embodiment. As described above, as the tractor towing the implement in a forward direction F is moved from a first position 510 to a second position 520, the rightmost transducer 132 of the automatic guidance system 100 detects a change in the observed field beneath it owing to the nature of the meandering furrow 12, wherein the rightmost transducer 132 produces a variable ranging output signal as described above that is proportional to a distance between the respective transducer and field adjacent to the furrow. The leftmost transducer 131 also produces a variable ranging output signal as described above that is proportional to a distance between the respective transducer and field adjacent to the furrow. However, since only the rightmost transducer 132 encounters the edge of the furrow 12 as the implement is moved in the forward direction F from the first position 510 (FIG. 5) to the second position 520 (FIG. 5) the variable ranging output signal of the rightmost transducer 132 changes more than the variable ranging output signal of the leftmost transducer 131. The variable ranging output signal of the leftmost transducer 131 does not change or changes less than the variable ranging output signal of the rightmost transducer 132, in the example. Preferably, in the example embodiment, the transducers 131, 132 are first and second ultrasound transducers 231, 232 as described above.

The first carriage device 261 may be automatically moved under control of the controller 150 on the transducer attachment portion 116 of the main frame member 112 along the transverse axis T. The first carriage device 261 is configured to operatively couple the first ultrasound transducer 231 with the transducer attachment portion 116 of the main frame member 112, and to selectively carry the first ultrasound transducer 231 towards and away from the second ultrasound transducer 232 along the transverse axis T In addition, the first position feedback device 271 operatively coupled with the controller 150 generates a first position feedback signal 281 representative of a position of the first ultrasound transducer 231 on the transverse axis T. In addition, the first prime mover device 291 operatively coupled with the controller 150 is responsive to a first position command signal 391 received from the controller 150 to move the first carriage device 261 carrying the first ultrasound transducer 231 towards and away from the second ultrasound transducer 232 along the transverse axis T. The furrow detection logic 310 stored in the memory device 154 of the controller 150 is executable by the processor 152 to locate a first edge 22 of the furrow 12 by generating the first position command signal 391 to control the first prime mover device 291 to move the first carriage device 261 carrying the first ultrasound transducer 231 along the transverse axis T based on the first variable ranging output signal generated by the first ultrasound transducer indicating a change above a predetermined threshold in the distance between the first ultrasound transducer and the field adjacent to the furrow 12.

FIG. 6b is a schematic illustration of a human readable display 172 on a human interface device 170 providing automatic guidance in the form of a guidance image 174 for assisting an operator tow the implement along a desired track 10 relative to the furrow shown in FIG. 6a in accordance with an example embodiment. In the example embodiment, the guidance image 174 has a curve, the slope 175 of which is proportional to the position of the sensor devices from the extreme ends of the transducer attachment portion of the support member. In the example shown, the right transducer 232 is shifted all the way towards the right of the transducer attachment portion 116 of the main frame member 112 and, accordingly, the slope 175 of the guidance image 174 is at a maximum degree within the steerability of the tractor. The guidance image 174 shown in FIG. 6b generally instructs the operator to steer the tractor hard to the right in order that the implement may follow the meandering furrow 12 shown in FIG. 5.

Figure 7A:
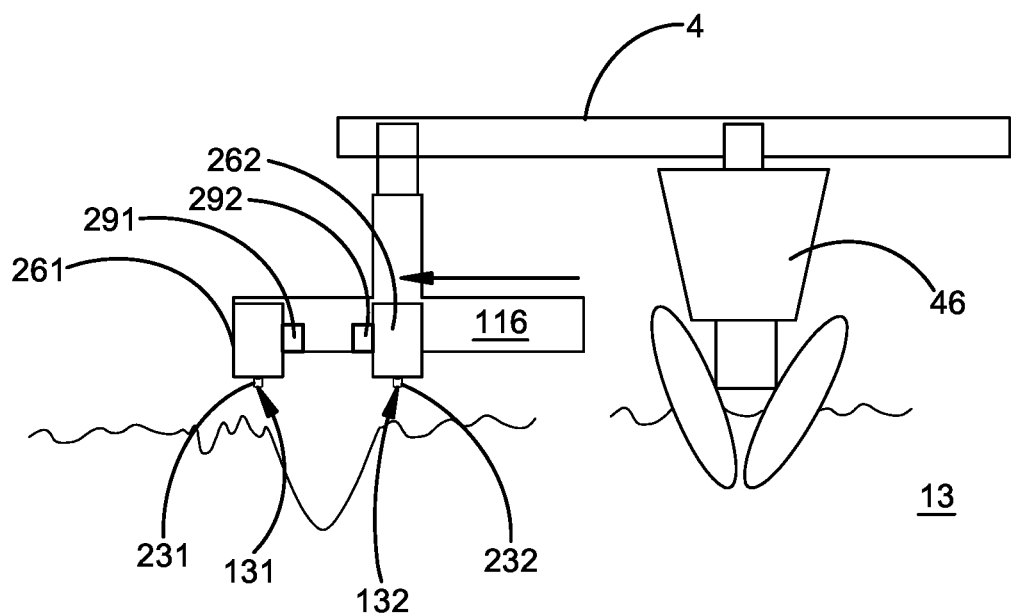
FIG. 7a is a schematic illustration of the portion of the automatic guidance system of FIG. 2 illustrating a movable sensor tracking a furrow in a field in accordance with an example embodiment.

The furrow 12 may also meander to the left, however. FIG. 7a is a schematic illustration of the portion of the automatic guidance system of FIG. 2 illustrating a movable sensor tracking a furrow meandering to the left in a field in accordance with an example embodiment, and FIG. 7b is a schematic illustration of a human readable display 172 on a human interface device 170 providing automatic guidance for assisting an operator tow the implement along a desired track 10 relative to the furrow shown in FIG. 6a in accordance with an example embodiment.

As described above, as the tractor towing the implement in a forward direction F is moved from a first position to a second position, the leftmost transducer 131 of the automatic guidance system 100 may detect a change in the observed field beneath it owing to the nature of the meandering furrow 12, wherein the leftmost transducer 131 produces a variable ranging output signal as described above that is proportional to a distance between the respective transducer and field adjacent to the furrow. The rightmost transducer 132 also produces a variable ranging output signal as described above that is proportional to a distance between the respective transducer and field adjacent to the furrow. However, since only the leftmost transducer 131 encounters the edge of the furrow 12 as shown in FIG. 7a as the implement is moved in the forward direction F from a first position to a second position only the variable ranging output signal of the leftmost transducer 131 changes. The variable ranging output signal of the rightmost transducer 132 does not change, in the example of FIGS. 7a, 7b.

However, the second carriage device 262 is moved on the transducer attachment portion 116 of the main frame member 112 along the transverse axis T. The second carriage device 262 is configured to operatively couple the second ultrasound transducer 232 with the transducer attachment portion 116 of the main frame member 112, and to selectively carry the second ultrasound transducer 232 towards and away from the first ultrasound transducer 231 along the transverse axis T In addition, the second position feedback device 272 operatively coupled with the controller 150 generates a second position feedback signal 282 representative of a position of the second ultrasound transducer 232 on the transverse axis T. In addition, the second prime mover device 292 operatively coupled with the controller 150 is responsive to the second position command signal 392 received from the controller 150 to move the second carriage device 262 carrying the second ultrasound transducer 232 towards and away from the first ultrasound transducer 231 along the transverse axis T. The furrow detection logic 310 stored in the memory device 154 of the controller 150 is executable by the processor 152 to locate a second edge 23 of the furrow 12 by generating the second position command signal 392 to control the second prime mover device 292 to move the second carriage device 262 carrying the second ultrasound transducer 232 along the transverse axis T based on the second variable ranging output signal generated by the second ultrasound transducer indicating a change above a predetermined threshold in the distance between the second ultrasound transducer and the field adjacent to the furrow 12.

Figure 7B:
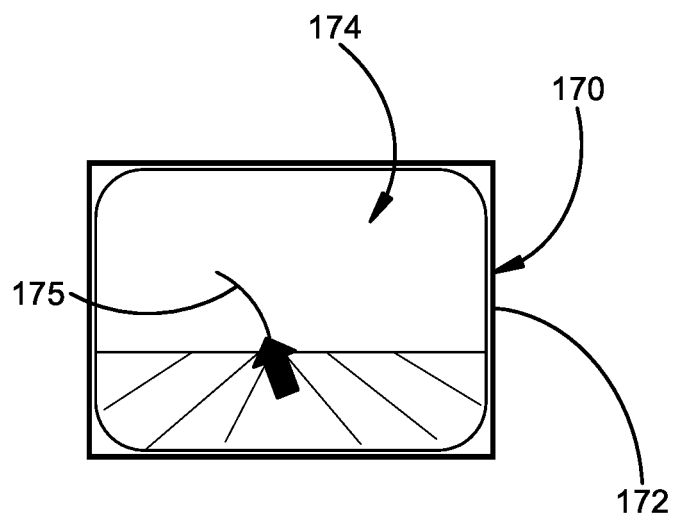
FIG. 7b is a schematic illustration of a human readable display on a human interface device providing automatic guidance for assisting an operator tow the implement along a desired track relative to the furrow shown in FIG. 6a in accordance with an example embodiment.

FIG. 7b is a schematic illustration of a human readable display 172 on a human interface device 170 providing automatic guidance in the form of a guidance image 174 for assisting an operator tow the implement along a desired track 10 relative to the furrow shown in FIG. 7a in accordance with an example embodiment. In the example embodiment, the guidance image 174 has a curve, the slope 175 of which is proportional to the position of the sensor devices from the extreme ends of the transducer attachment portion of the support member. In the example shown, the left transducer 231 is shifted all the way towards the left of the transducer attachment portion 116 of the main frame member 112 and, accordingly, the slope 175 of the guidance image 174 is at a maximum degree within the steerability of the tractor. The guidance image 174 shown in FIG. 7b generally instructs the operator to steer the tractor hard to the left in order that the implement may follow the meandering furrow 12 meandering towards the left.

Figure 8:
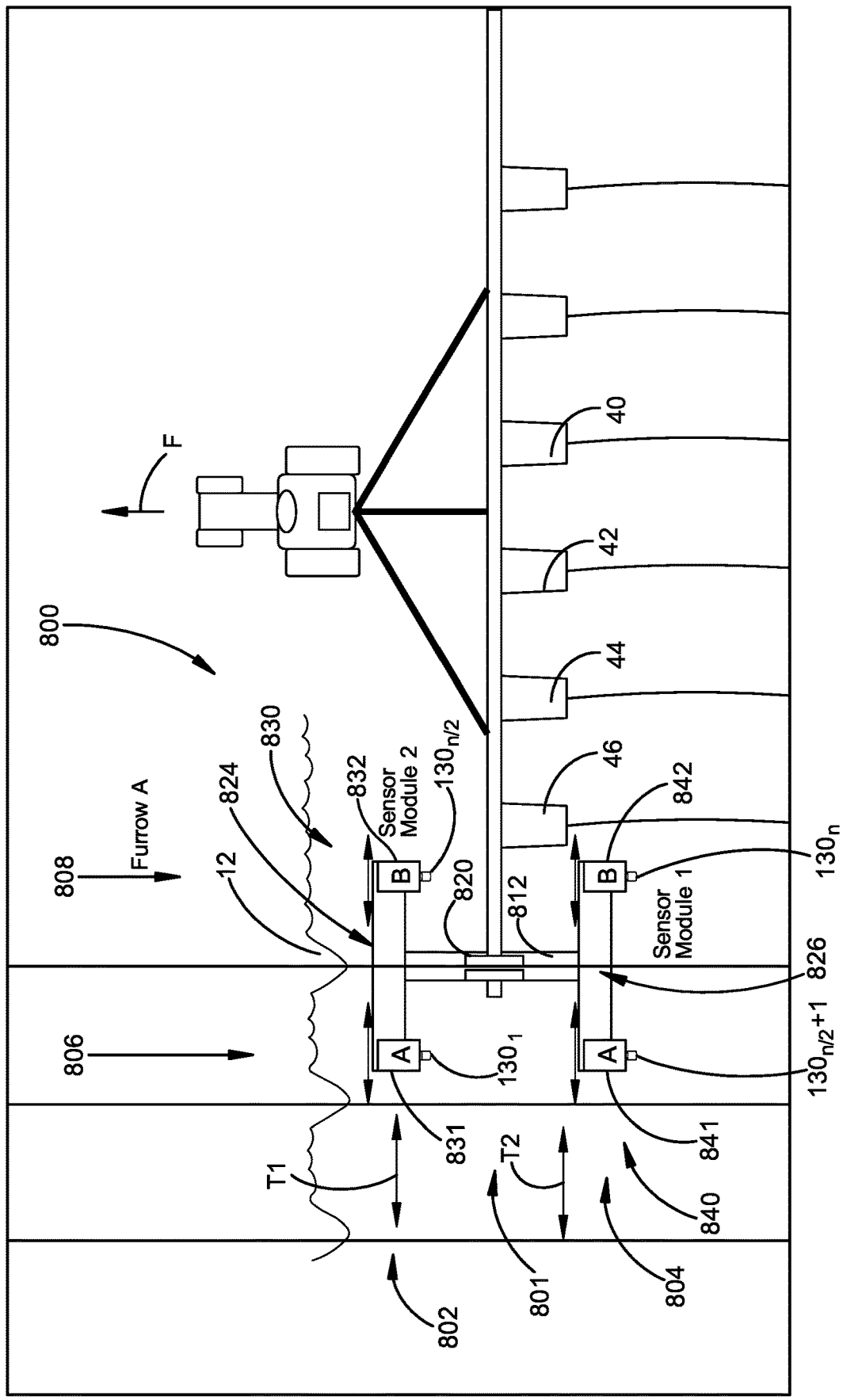
FIG. 8 is a schematic illustration of an automatic guidance system in accordance with a further example embodiment mountable on an associated combination work vehicle including an implement coupled to a tractor.

FIG. 8 is a schematic illustration of an automatic guidance system 800 in accordance with a further example embodiment mountable on an associated combination work vehicle including an implement coupled to a tractor. The automatic guidance system is shown from an overhead or top plan view and includes a plurality of transducers $130_1$-$130_n$ arranged on the mounting system 110 in a matrix 801 having rows 802, 804 of ultrasound transducers spanning the furrow 12 behind the tractor of the associated combination work vehicle moving in the forward direction F, and columns 806, 808 of ultrasound transducers on opposite sides of the furrow behind the tractor of the associated combination work vehicle moving in the forward direction.

With continued reference to FIG. 8, in an embodiment the mounting system 110 may include a main frame member 812 including a boom attachment portion 820 configured to attach the mounting system 110 with an implement boom 4 of the associated implement 2 of the combination work vehicle 1, a first transducer attachment portion 824 configured to couple a first set 830 of the plurality of transducers with the mounting system mutually spaced apart relative to each other along a first transverse axis T1, and a second transducer attachment portion 826 offset from the first transducer attachment portion 824 in the forward direction F. The second transducer attachment portion 826 is configured to couple a second set 840 of the plurality of transducers with the mounting system mutually spaced apart relative to each other along a second transverse axis T2. In the example embodiment, the first and second transverse axes T1, T2 are substantially mutually parallel. Also in the example embodiment, the first transverse axis T1 and the forward direction F of the moving tractor are substantially mutually perpendicular. Yet still further in the example embodiment, the second transverse axis T2 and the forward direction F of the moving tractor are substantially mutually perpendicular.

In one embodiment such as shown in FIG. 8, for example, the first set 830 of the plurality of transducers $130_1$-$130_n$ includes a first ultrasound transducer 831 operative to produce a first variable ranging output signal proportional to a distance between the first ultrasound transducer 831 and field adjacent to the furrow, and a second ultrasound transducer 832 operative to produce a second variable ranging output signal proportional to a distance between the second ultrasound transducer 832 and the field adjacent to the furrow.

The second set 840 of the plurality of transducers $130_1$-$130_n$ includes a third ultrasound transducer 841 operative to produce a third variable ranging output signal proportional to a distance between the third ultrasound transducer 841 and the field adjacent to the furrow, and a fourth ultrasound transducer 842 operative to produce a fourth variable ranging output signal proportional to a distance between the fourth ultrasound transducer 842 and the field adjacent to the furrow.

In addition, the mounting system 110 includes main frame member 812 comprising a boom attachment portion 820 configured to attach the mounting system with an implement boom of the associated implement of the combination work vehicle, a first transducer attachment portion 824 configured to couple the first and second ultrasound transducers 831, 832 with the mounting system mutually spaced apart relative to each other along the first transverse axis T1, and a second transducer attachment portion 826 offset from the first transducer attachment portion 824 in the forward direction F. The second transducer attachment portion 826 is configured to couple the third and fourth ultrasound transducers 841, 842 with the mounting system mutually spaced apart relative to each other along a second transverse axis. In the example embodiment, the first and second transverse axes T1, T2 are substantially mutually parallel. Also in the example embodiment, the first transverse axis T1 and the forward direction F of the moving tractor 3 are substantially mutually perpendicular. Yet still further in the example embodiment, the second transverse axis T2 and the forward direction F of the moving tractor 3 are substantially mutually perpendicular.

Figure 9:
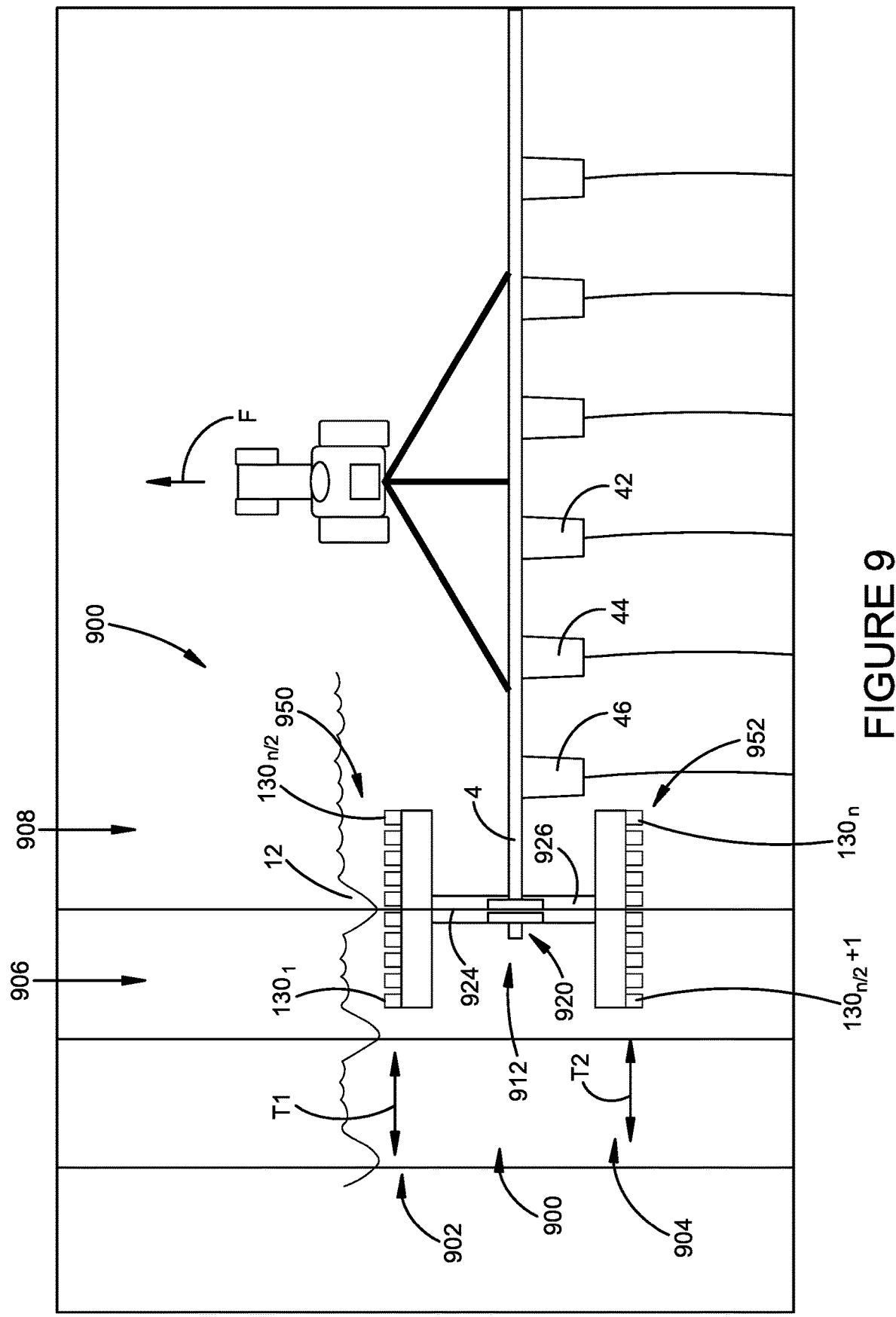
FIG. 9 is a schematic illustration of an automatic guidance system in accordance with a further example embodiment mountable on an associated combination work vehicle including an implement coupled to a tractor.

FIG. 9 is a schematic illustration of an automatic guidance system 900 in accordance with a further example embodiment mountable on an associated combination work vehicle including an implement coupled to a tractor. The automatic guidance system as shown includes a plurality of transducers $130_1$-$130_n$ arranged on the mounting system 110 in a matrix 900 having rows 902, 904 of ultrasound transducers spanning the furrow 12 behind the tractor of the associated combination work vehicle moving in the forward direction, and columns 906, 908 of ultrasound transducers on opposite sides of the furrow behind the tractor of the associated combination work vehicle moving in the forward direction.

With continued reference to FIG. 9, in an embodiment the mounting system 110 may include a main frame member 912 including a boom attachment portion 920 configured to attach the mounting system 110 with an implement boom 4 of the associated implement 2 of the combination work vehicle 1, a first transducer attachment portion 924 configured to couple a first set 902 of the plurality of transducers with the mounting system mutually spaced apart in an array 950 relative to each other along a first transverse axis T1, and a second transducer attachment portion 926 offset from the first transducer attachment portion 924 in the forward direction F. The second transducer attachment portion 926 is configured to couple a second set 904 of the plurality of transducers with the mounting system mutually spaced apart in a further array 952 relative to each other along a second transverse axis T2. In the example embodiment, the first and second transverse axes T1, T2 are substantially mutually parallel. Also in the example embodiment, the first transverse axis T1 and the forward direction F of the moving tractor are substantially mutually perpendicular. Yet still further in the example embodiment, the second transverse axis T2 and the forward direction F of the moving tractor are substantially mutually perpendicular.

Each of the plurality of ultrasound transducers 902, 904 arranged on the mounting system is operative to emit a respective ranging signal in a direction of field 13 adjacent to the furrow 12, to receive a reflection of the first ranging signal from the field 13, and to produce a corresponding variable ranging output signal proportional to the distance d between the first ultrasound transducer and the field 13 adjacent to the furrow 12. In the embodiment, the furrow detection logic 310 is operable to determine the location of the furrow 12 relative to the mounting system 110 based on the set of variable ranging output signals received from the plurality of ultrasound transducers 902, 904 arranged in the arrays 950, 952.

In addition, the mounting system 110 includes main frame member 912 comprising a boom attachment portion 920 configured to attach the mounting system with an implement boom of the associated implement of the combination work vehicle, a first transducer attachment portion 924 configured to couple the first ultrasound transducer array 902 with the mounting system mutually spaced apart relative to each other along the first transverse axis T1, and a second transducer attachment portion 926 offset from the first transducer attachment portion 924 in the forward direction F. The second transducer attachment portion 926 is configured to couple the ultrasound transducer array 904 with the mounting system mutually spaced apart relative to each other along a second transverse axis. In the example embodiment, the first and second transverse axes T1, T2 are substantially mutually parallel. Also in the example embodiment, the first transverse axis T1 and the forward direction F of the moving tractor 3 are substantially mutually perpendicular. Yet still further in the example embodiment, the second transverse axis T2 and the forward direction F of the moving tractor 3 are substantially mutually perpendicular.

It is to be appreciated that a benefit of using the two arms of sensors—one at forward of boom and on at rear of boom, in the example embodiments illustrated in FIGS. 8 and 9, is to get early feedback from the sensors from forward arm about any deviation in path and that can be confirmed by sensors on rear arms whereby the accuracy and responsiveness of system can be improved.

Figure 10A:
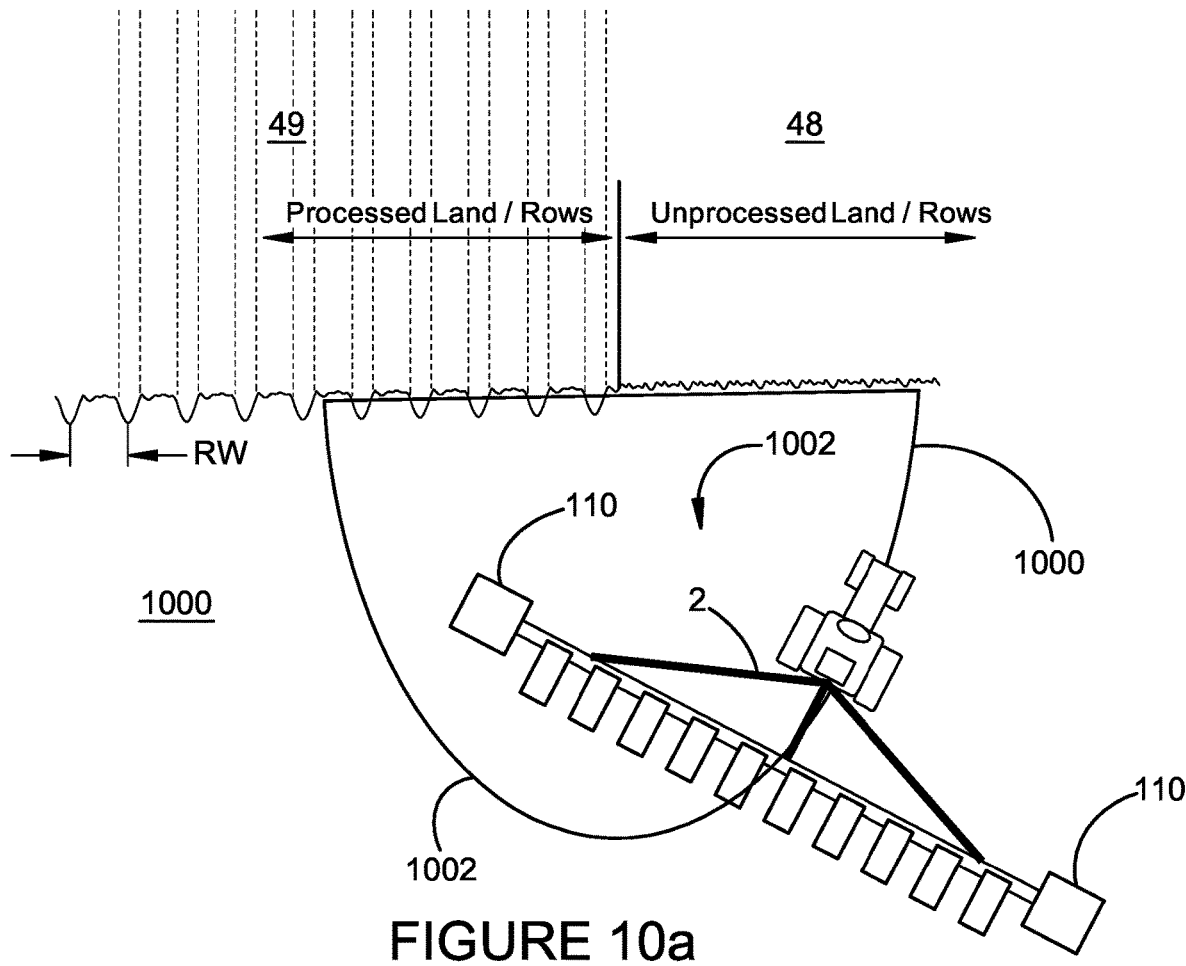
FIG. 10a is a schematic illustration of a headland turn path for navigating a turn in a headland of a field for rejoining an implement with a desired track relative to furrows having previously been processed such as by planting in accordance with an example embodiment.
Figure 10B:
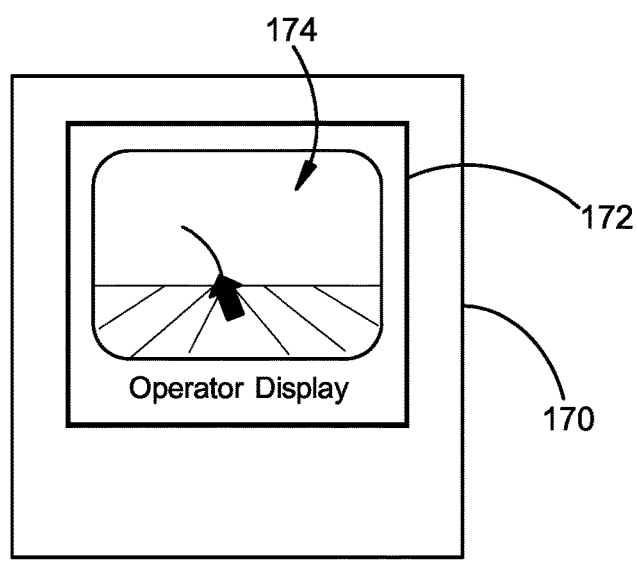
FIG. 10b is a schematic illustration of a human readable display on a human interface device providing automatic guidance for assisting an operator navigate a turn in a headland of a field for rejoining an implement with a desired track relative to the furrows shown in FIG. 10a in accordance with an example embodiment.

FIG. 10a is a schematic illustration of a headland turn path system 1000 for navigating a turn 1002 in a headland 1100 of a field for rejoining an implement 2 with a desired track 10 relative to furrows 12 having previously been processed such as by planting in accordance with an example embodiment, and FIG. 10b is a schematic illustration of a human readable display 172 on a human interface device 170 providing automatic guidance for assisting an operator navigate a turn in a headland 1100 of a field for rejoining an implement with a desired track 10 relative to the furrows shown in FIG. 10a in accordance with an example embodiment.

In the example, embodiment, the controller 150 includes an inertial measurement unit (IMU) 450 (FIG. 4) disposed on the implement and connected with the input and output interface 406. In addition, the controller may be operably connected with a magnetometer 407 and/or a speed sensor 408 to detect the direction of the operation of the tractor, and travelling speed of the system. The controller 150 is operable, based on data stored in the memory device 154 representative of the machine width and the turning radius of the tractor to develop and provide a guideline to the operator to follow in a headland of the field for making a turn so that the outermost planter is spaced from the last row planted and so that the plurality of transducers $130_1$-$130_n$ arranged on the mounting system 110 reengage with the last most planted furrow 12' in the field.

A human interface device 170 receives a tractor headland turning signal from the controller 150, wherein the human interface device 170 includes a human readable display 172 for generating a headland turning guidance image 1074 viewable by the operator in the tractor 3 representative of the tractor headland turn path 1000 for navigating a turn 1002 in a headland 1100 of a field for rejoining an implement 2 with a desired track 10 relative to furrows 12 having previously been processed such as by planting in accordance with an example embodiment.

Figure 11A:
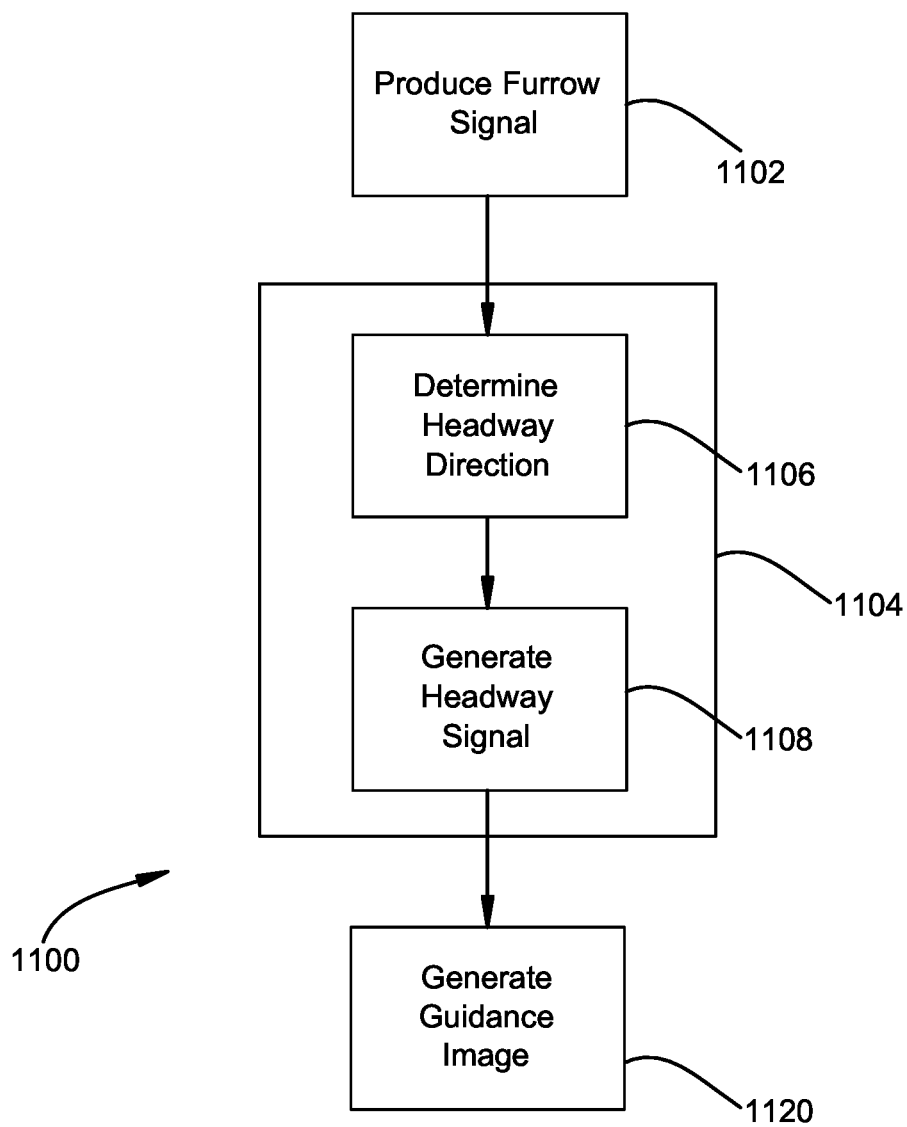
FIGS. 11a and 11b are flow diagrams showing automatic guidance assist methods for assisting guiding an implement relative to a furrow in accordance with an example embodiment.

FIG. 11a is a flow diagram showing an automatic guidance assist method 1100 for assisting guiding an implement 2 of an associated work vehicle 1 as the implement 2 is moved in a forward direction F along a desired track 10 relative to a furrow 12 in accordance with an example embodiment. With reference now to that Figure, a variable output signal 132 is produced at step 1102 by a set of transducers 130. The variable output signal 132 is related to a condition of field 13 adjacent to the furrow 12.

At step 1104 guidance assistance logic 156 stored in a memory device 154 of a controller 150 operatively coupled with the set of transducers 130 is executed to determine a headway direction. In particular, the guidance assistance logic 156 is executed by a processor 152 of the controller 150 to determine the headway direction.

In the example embodiment, the guidance assistance logic 156 is executed by a processor 152 of the controller 150 in step 1106 to determine 1106 a headway direction 160 based on the variable output signal 132 produced by the set of transducers 130. The headway direction 160 (FIG. 5) is representative of a direction D (FIG. 5) to direct the implement 2 moving in the forward direction F to guide the implement 2 along the desired track 10 relative to the furrow 12.

Further in the example embodiment, the guidance assistance logic 156 is executed by the processor 152 in step 1108 to generate 1108 a headway signal 163 representative of the determined headway direction 160.

The automatic guidance assist method 1100 further includes generating at step 1120 in response to the headway signal 163 a guidance image 174 on a human readable display 172 of a human interface device 170 operatively coupled with the controller 150. The guidance image 174 is viewable by an operator of the associated work vehicle 1 and representative of the headway signal 163 for assisting the operator visualize the headway signal 163 for steering the associated work vehicle 1 to guide the implement 2 along the desired track 10 relative to the furrow 12.

Figure 11B:
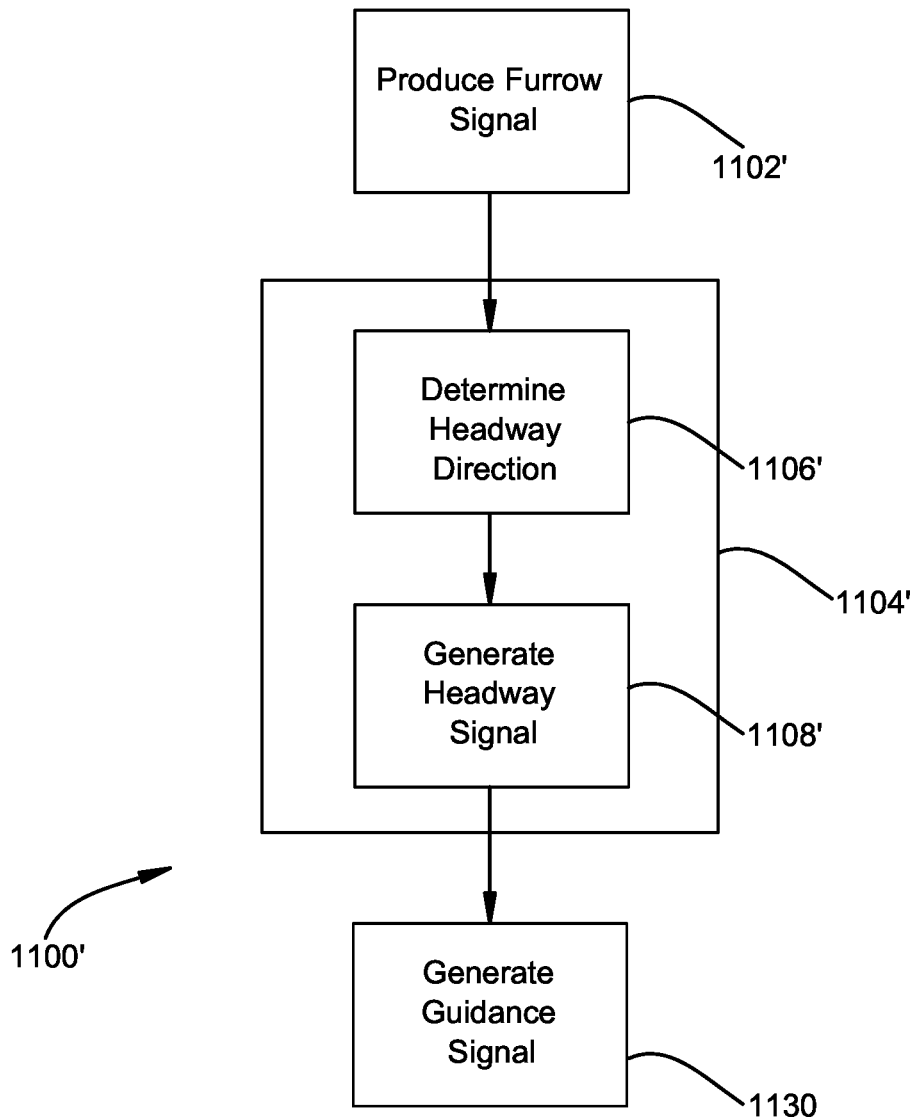

FIG. 11b is a flow diagram showing an automatic guidance assist method 1100' for assisting guiding an implement 2 of an associated work vehicle 1 as the implement 2 is moved in a forward direction F along a desired track 10 relative to a furrow 12 in accordance with a further example embodiment. With reference now to that Figure, a variable output signal 132 is produced at step 1102' by a set of transducers 130. The variable output signal 132 is related to a condition of field 13 adjacent to the furrow 12.

At step 1104' guidance assistance logic 156 stored in a memory device 154 of a controller 150 operatively coupled with the set of transducers 130 is executed to generate a headway signal. In particular, the guidance assistance logic 156 is executed by a processor 152 of the controller 150 to generate the headway signal.

In step 1106' the guidance assistance logic 156 is executed by the processor 152 to determine 1106' a headway direction 160 based on the variable output signal 132 produced by the set of transducers 130. The headway direction 160 (FIG. 5)

is representative of a direction D (FIG. 5) to direct the implement 2 moving in the forward direction F to guide the implement 2 along the desired track 10 relative to the furrow 12.

In step 1108' the guidance assistance logic 156 is executed by the processor 152 to generate 1108 a headway signal 163 representative of the determined headway direction 160.

The automatic guidance assist method 1100' further includes generating 1130 in response to the headway signal 163 a guidance signal 184 on a machine interface device 180 operatively coupled with the controller 150, the guidance signal 184 being representative of the headway signal 163 and usable to automatically steer the associated work vehicle 1 to move the implement 2 along the desired track 10 relative to the furrow 12.

The foregoing description and examples has been set forth merely to illustrate the disclosure and are not intended as being limiting. Each of the disclosed aspects and embodiments of the present disclosure may be considered individually or in combination with other aspects, embodiments, and variations of the disclosure. In addition, unless otherwise specified, none of the steps of the methods of the present disclosure are confined to any particular order of performance. Modifications of the disclosed embodiments incorporating the spirit and substance of the disclosure may occur to persons skilled in the art and such modifications are within the scope of the present disclosure. Furthermore, all references cited herein are incorporated by reference in their entirety.

As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

Terms of orientation used herein, such as "top," "bottom," "horizontal," "vertical," "longitudinal," "lateral," and "end" are used in the context of the illustrated embodiment. However, the present disclosure should not be limited to the illustrated orientation. Indeed, other orientations are possible and are within the scope of this disclosure. Terms relating to circular shapes as used herein, such as diameter or radius, should be understood not to require perfect circular structures, but rather should be applied to any suitable structure with a cross-sectional region that can be measured from side-to-side. Terms relating to shapes generally, such as "circular" or "cylindrical" or "semi-circular" or "semi-cylindrical" or any related or similar terms, are not required to conform strictly to the mathematical definitions of circles or cylinders or other structures, but can encompass structures that are reasonably close approximations.

Conditional language used herein, such as, among others, "can," "might," "may," "e.g.," and the like, unless specifically stated otherwise, or otherwise understood within the context as used, is generally intended to convey that some embodiments include, while other embodiments do not include, certain features, elements, and/or states. Thus, such conditional language is not generally intended to imply that features, elements, blocks, and/or states are in any way required for one or more embodiments or that one or more embodiments necessarily include logic for deciding, with or without author input or prompting, whether these features, elements and/or states are included or are to be performed in any particular embodiment.

Conjunctive language, such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

The terms "approximately," "about," and "substantially" as used herein represent an amount close to the stated amount that still performs a desired function or achieves a desired result. For example, in some embodiments, as the context may dictate, the terms "approximately", "about", and "substantially" may refer to an amount that is within less than or equal to 10% of the stated amount. The term "generally" as used herein represents a value, amount, or characteristic that predominantly includes or tends toward a particular value, amount, or characteristic. As an example, in certain embodiments, as the context may dictate, the term "generally parallel" can refer to something that departs from exactly parallel by less than or equal to 20 degrees.

Unless otherwise explicitly stated, articles such as "a" or "an" should generally be interpreted to include one or more described items. Accordingly, phrases such as "a device configured to" are intended to include one or more recited devices. Such one or more recited devices can be collectively configured to carry out the stated recitations. For example, "a processor configured to carry out recitations A, B, and C" can include a first processor configured to carry out recitation A working in conjunction with a second processor configured to carry out recitations B and C.

The terms "comprising," "including," "having," and the like are synonymous and are used inclusively, in an open-ended fashion, and do not exclude additional elements, features, acts, operations, and so forth. Likewise, the terms "some," "certain," and the like are synonymous and are used in an open-ended fashion. Also, the term "or" is used in its inclusive sense (and not in its exclusive sense) so that when used, for example, to connect a list of elements, the term "or" means one, some, or all of the elements in the list.

Overall, the language of the claims is to be interpreted broadly based on the language employed in the claims. The language of the claims is not to be limited to the non-exclusive embodiments and examples that are illustrated and described in this disclosure, or that are discussed during the prosecution of the application.

Although systems and methods for automatic guidance assistance have been disclosed in the context of certain embodiments and examples, this disclosure extends beyond the specifically disclosed embodiments to other alternative embodiments and/or uses of the embodiments and certain modifications and equivalents thereof. Various features and aspects of the disclosed embodiments can be combined with or substituted for one another in order to form varying modes of systems and methods for automatic guidance assistance. The scope of this disclosure should not be limited by the particular disclosed embodiments described herein.

Certain features that are described in this disclosure in the context of separate implementations can be implemented in combination in a single implementation. Conversely, various features that are described in the context of a single implementation can be implemented in multiple implementations separately or in any suitable sub-combination. Although features may be described herein as acting in certain combinations, one or more features from a claimed combination can, in some cases, be excised from the combination, and the combination may be claimed as any sub-combination or variation of any sub-combination.

While the methods and devices described herein may be susceptible to various modifications and alternative forms, specific examples thereof have been shown in the drawings and are herein described in detail. It should be understood, however, that the invention is not to be limited to the particular forms or methods disclosed, but, to the contrary, the invention is to cover all modifications, equivalents, and alternatives falling within the spirit and scope of the various embodiments described and the appended claims. Further, the disclosure herein of any particular feature, aspect, method, property, characteristic, quality, attribute, element, or the like in connection with an embodiment can be used in all other embodiments set forth herein. Any methods disclosed herein need not be performed in the order recited. Depending on the embodiment, one or more acts, events, or functions of any of the algorithms, methods, or processes described herein can be performed in a different sequence, can be added, merged, or left out altogether (e.g., not all described acts or events are necessary for the practice of the algorithm). In some embodiments, acts or events can be performed concurrently, e.g., through multi-threaded processing, interrupt processing, or multiple processors or processor cores or on other parallel architectures, rather than sequentially. Further, no element, feature, block, or step, or group of elements, features, blocks, or steps, are necessary or indispensable to each embodiment. Additionally, all possible combinations, sub-combinations, and rearrangements of systems, methods, features, elements, modules, blocks, and so forth are within the scope of this disclosure. The use of sequential, or time-ordered language, such as "then," "next," "after," "subsequently," and the like, unless specifically stated otherwise, or otherwise understood within the context as used, is generally intended to facilitate the flow of the text and is not intended to limit the sequence of operations performed. Thus, some embodiments may be performed using the sequence of operations described herein, while other embodiments may be performed following a different sequence of operations.

Moreover, while operations may be depicted in the drawings or described in the specification in a particular order, such operations need not be performed in the particular order shown or in sequential order, and all operations need not be performed, to achieve the desirable results. Other operations that are not depicted or described can be incorporated in the example methods and processes. For example, one or more additional operations can be performed before, after, simultaneously, or between any of the described operations. Further, the operations may be rearranged or reordered in other implementations. Also, the separation of various system components in the implementations described herein should not be understood as requiring such separation in all implementations, and it should be understood that the described components and systems can generally be integrated together in a single product or packaged into multiple products. Additionally, other implementations are within the scope of this disclosure.

Some embodiments have been described in connection with the accompanying figures. Certain figures are drawn and/or shown to scale, but such scale should not be limiting, since dimensions and proportions other than what are shown are contemplated and are within the scope of the embodiments disclosed herein. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, any methods described herein may be practiced using any device suitable for performing the recited steps.

The methods disclosed herein may include certain actions taken by a practitioner; however, the methods can also include any third-party instruction of those actions, either expressly or by implication. For example, actions such as "positioning an electrode" include "instructing positioning of an electrode."

The ranges disclosed herein also encompass any and all overlap, subranges, and combinations thereof. Language such as "up to," "at least," "greater than," "less than," "between," and the like includes the number recited. Numbers preceded by a term such as "about" or "approximately" include the recited numbers and should be interpreted based on the circumstances (e.g., as accurate as reasonably possible under the circumstances, for example ±5%, ±10%, ±15%, etc.). For example, "about 1 V" includes "1 V." Phrases preceded by a term such as "substantially" include the recited phrase and should be interpreted based on the circumstances (e.g., as much as reasonably possible under the circumstances). For example, "substantially perpendicular" includes "perpendicular." Unless stated otherwise, all measurements are at standard conditions including temperature and pressure.

In summary, various embodiments and examples of systems and methods for automatic guidance assistance have been disclosed. Although the systems and methods for automatic guidance assistance have been disclosed in the context of those embodiments and examples, this disclosure extends beyond the specifically disclosed embodiments to other alternative embodiments and/or other uses of the embodiments, as well as to certain modifications and equivalents thereof. This disclosure expressly contemplates that various features and aspects of the disclosed embodiments can be combined with, or substituted for, one another. Thus, the scope of this disclosure should not be limited by the particular disclosed embodiments described herein, but should be determined only by a fair reading of the claims that follow.

The invention claimed is:

1. An automatic guidance assist system for assisting guiding an implement of an associated work vehicle as the implement is moved in a forward direction (F) along a desired track relative to a furrow, the automatic guidance assist system comprising:
 a set of transducers operable to produce a variable output signal set related to a condition of a field adjacent to the furrow;
 a controller operatively coupled with the set of transducers, the controller comprising a processor, a memory device and guidance assistance logic stored in the memory device, the guidance assistance logic being executable by the processor to:
  determine a headway direction based on the variable output signal set produced by the set of transducers, the headway direction being representative of a direction (D) to direct the implement in the forward direction (F) to guide the implement along the desired track relative to the furrow; and
  generate a headway signal representative of the determined headway direction; and
 a human interface device operatively coupled with the controller and comprising a human readable display, the human interface device displaying a guidance image on the human readable display based on the headway signal, wherein the guidance image displayed on the human readable display is viewable by an operator of the associated work vehicle, wherein the guidance image displayed on the human readable display comprises a visual representation of the headway signal that is viewable by the operator of the associated work vehicle for assisting the operator visualize the headway signal for steering the associated work vehicle to guide the implement along the desired track relative to the furrow.

2. The automatic guidance assist system according to claim 1, further comprising:

a machine interface device operatively coupled with the controller, the machine interface device being operable to generate in response to the headway signal, a guidance signal representative of the headway signal, the guidance signal being usable to automatically steer the associated work vehicle to move the implement along the desired track relative to the furrow.

3. The automatic guidance assist system according to claim 1, further comprising:

a mounting system configured to attach with the implement of the associated work vehicle, wherein the mounting system comprises a main frame member comprising:

a boom attachment portion configured to attach the mounting system with an implement boom of the associated implement of the associated work vehicle;

a first transducer attachment portion configured to couple a first group of the set of transducers with the mounting system mutually spaced apart relative to each other along a first transverse axis (T1); and a second transducer attachment portion offset from the first transducer attachment portion in the forward direction (F), the second transducer attachment portion being configured to couple a second group of the set of transducers with the mounting system mutually spaced apart relative to each other along a second transverse axis (T2), wherein the first and second transverse axes (T1, T2) are substantially mutually parallel, wherein the first transverse axis (T1) and the forward direction (F) are substantially mutually perpendicular, wherein the second transverse axis (T2) and the forward direction (F) are substantially mutually perpendicular.

4. The automatic guidance assist system according to claim 1, further comprising:

a mounting system configured to attach with the implement of the associated work vehicle, wherein the mounting system comprises a main frame member comprising:

a boom attachment portion configured to attach the mounting system with an implement boom of the implement of the associated work vehicle; and a first transducer attachment portion configured to couple the set of transducers with the mounting system in a mutually spaced apart relationship relative to each other along a transverse axis (T), wherein the transverse axis (T) and the forward direction (F) are substantially mutually perpendicular.

5. The automatic guidance assist system according to claim 4, wherein:

the set of transducers comprise a plurality of ultrasound transducers arranged on the mounting system in a matrix having:

rows of ultrasound transducers, wherein each row of ultrasound transducers is mutually spaced apart and disposed on the mounting system to span the furrow as the implement is moved in the forward direction (F) along the desired track relative to the furrow; and columns of ultrasound transducers, wherein each column of ultrasound transducers is carried on the mounting system on opposite sides of the furrow as the implement is moved in the forward direction (F) along the desired track relative to the furrow.

6. The automatic guidance assist system according to claim 4, wherein:

the set of transducers comprises a plurality of transducers coupled with the transducer attachment portion of the mounting system, the plurality of transducers being operative to produce a plurality of variable ranging output signals each being proportional to a distance between the respective transducer and the field adjacent to the furrow; and the controller is operatively coupled with the plurality of transducers and the guidance assistance logic is executable by the processor to:

determine the headway direction based on the plurality of variable ranging output signals received by the controller from the plurality of transducers.

7. The automatic guidance assist system according to claim 6, wherein:

the plurality of transducers comprise a plurality of ultrasound transducers arranged on the mounting system in an array to span the furrow as the implement is moved in the forward direction (F) along the desired track relative to the furrow.

8. The automatic guidance assist system according to claim 6, wherein:

the plurality of transducers comprise:

a first ultrasound transducer operative to produce a first variable ranging output signal proportional to a distance between the first ultrasound transducer and the field adjacent to the furrow;

a second ultrasound transducer operative to produce a second variable ranging output signal proportional to a distance between the second ultrasound transducer and the field adjacent to the furrow;

a third ultrasound transducer operative to produce a third variable ranging output signal proportional to a distance between the third ultrasound transducer and the field adjacent to the furrow;

a fourth ultrasound transducer operative to produce a fourth variable ranging output signal proportional to a distance between the fourth ultrasound transducer and the field adjacent to the furrow; and the main frame member of the mounting system comprises:

a second transducer attachment portion offset from the first transducer attachment portion in the forward direction (F), the second transducer attachment portion being configured to couple the third and fourth ultrasound transducers with the mounting system in a mutually spaced apart relationship relative to each other along a second transverse axis (T2), the first and second transverse axes (T1, T2) are substantially mutually parallel, the first transverse axis (T1) and the forward direction (F) are substantially mutually perpendicular, the second transverse axis (T2) and the forward direction (F) are substantially mutually perpendicular.

9. A automatic guidance assist system for assisting guiding an implement of an associated work vehicle as the implement is moved in a forward direction (F) along a desired track relative to a furrow, the automatic guidance assist system comprising:
a set of transducers operable to produce a variable output signal set related to a condition of a field adjacent to the furrow;
a controller operatively coupled with the set of transducers, the controller comprising a processor, a memory device, an input and output interface, and guidance assistance logic stored in the memory device, the guidance assistance logic being executable by the processor to automatically:
determine a headway direction based on the variable output signal set produced by the set of transducers, the headway direction being representative of a direction (D) to direct the implement moving in the forward direction (F) to guide the implement along the desired track relative to the furrow; and
generate a headway signal representative of the determined headway direction; and
an inertial measurement unit disposed on the implement and operatively coupled with the input and output interface of the controller, the inertial measurement unit being operable to generate an inertia signal representative of a movement of the implement,
wherein the memory device stores size data representative of a width of the implement,
wherein the memory device stores radius data representative of a turning radius of the associated work vehicle,
wherein the controller is operative to automatically generate based on the inertia signal and based on the size data and the radius data, a headland turning signal representative of a headland turn path for assisting operating the associated work vehicle navigate a turn in a headland of the field for rejoining the implement with a desired track relative to furrows having previously been processed.

10. The automatic guidance assist system according to claim 9, further comprising:
a human interface device operatively coupled with the controller,
wherein the human interface device comprises a human readable display operable to display a headland turning guidance image representative of the headland turn path for navigating the turn in the headland of the field for rejoining the implement with the desired track relative to the furrows having previously been processed, the headland turning guidance image displayed on the human readable display being viewable by an operator of the associated work vehicle for assisting the operator visualize the headland turning signal for steering the associated work vehicle to move the implement to rejoin with the desired track relative to the furrows having previously been processed.

11. The automatic guidance assist system according to claim 9, further comprising:
a machine interface device operatively coupled with the controller, the machine interface device being operable to generate in response to the headland turning signal a guidance signal usable to automatically steer the associated work vehicle to move the implement to rejoin with the desired track relative to the furrows having previously been processed.

12. The automatic guidance assist system according to claim 6, wherein:
the plurality of transducers comprise a plurality of ultrasound transducers comprising first and second ultrasound transducers,
wherein the first ultrasound transducer is operative to emit a first ranging signal towards a field adjacent to the first ultrasound transducer, to receive a first reflection of the first ranging signal from the field adjacent to the first ultrasound transducer, and to produce a first variable ranging output signal proportional to a distance between the first ultrasound transducer and the field adjacent to the first ultrasound transducer,
wherein the second ultrasound transducer is operative to emit a second ranging signal towards a field adjacent to the first ultrasound transducer, to receive a second reflection of the second ranging signal from the field adjacent to the second ultrasound transducer, and to produce a second variable ranging output signal proportional to a distance between the second ultrasound transducer and the field adjacent to the second ultrasound transducer; and
the transducer attachment portion of the mounting system is configured to couple the first and second ultrasound transducers with the mounting system in a mutually spaced apart relationship relative to each other along the transverse axis (T).

13. The automatic guidance assist system according to claim 12, wherein the transducer attachment portion of the main frame member comprises:
a first carriage device movable on the transducer attachment portion of the main frame member along the transverse axis (T), wherein the first carriage device is configured to operatively couple the first ultrasound transducer with the transducer attachment portion of the main frame member, and to selectively carry the first ultrasound transducer towards and away from the second ultrasound transducer along the transverse axis (T); and
a second carriage device movable on the transducer attachment portion of the main frame member along the transverse axis (T), wherein the second carriage device is configured to operatively couple the second ultrasound transducer with the transducer attachment portion of the main frame member, and to selectively carry the second ultrasound transducer towards and away from the first ultrasound transducer along the transverse axis (T).

14. The automatic guidance assist system according to claim 13, further comprising:
a first position feedback device operatively coupled with the controller, wherein the first position feedback device is configured to generate a first position feedback signal representative of a position of the first ultrasound transducer on the transverse axis (T); and
a second position feedback device operatively coupled with the controller, wherein the second position feedback device is configured to generate a second position feedback signal representative of a position of the second ultrasound transducer on the transverse axis (T),
wherein the guidance logic is executable by the processor to determine the headway direction based on:
the first and second variable ranging output signals received by the controller from the first and second ultrasound transducers; and the first and second position feedback signals received by the controller from the first and second position feedback devices.

15. The automatic guidance assist system according to claim 14, further comprising:
a first motor device operatively coupled with the controller, wherein the first motor device is responsive to a first position command signal received from the controller to move the first carriage device carrying the first ultrasound transducer towards and away from the second ultrasound transducer along the transverse axis (T) in accordance with the first position command signal; and
a second motor device operatively coupled with the controller, wherein the second motor device is responsive to a second position command signal received from the controller to move the second carriage device carrying the second ultrasound transducer towards and away from the first ultrasound transducer along the transverse axis (T) in accordance with the second position command signal.

16. The automatic guidance assist system according to claim 15, wherein:
the controller comprises furrow detection logic stored in the memory device, the furrow detection logic being executable by the processor to:
locate a first edge of the furrow by generating the first position command signal to control the first motor device to move the first carriage device carrying the first ultrasound transducer along the transverse axis (T) based on the first variable ranging output signal generated by the first ultrasound transducer indicating a change above a predetermined threshold in the distance between the first ultrasound transducer and the field adjacent to the furrow; and
locate a second edge of the furrow opposite the first edge by generating the second position command signal to control the second motor device to move the second carriage device carrying the second ultrasound transducer along the transverse axis (T) based on the second variable ranging output signal generated by the second ultrasound transducer indicating a change above the predetermined threshold in the distance between the second ultrasound transducer and the field adjacent to the furrow.

17. An automatic guidance assist method for assisting guiding an implement of an associated work vehicle as the implement is moved in a forward direction (F) along a desired track relative to a furrow, the automatic guidance assist method comprising:
producing by a set of transducers a variable output signal set related to a condition of a field adjacent to the furrow;
executing by a processor of a controller operatively coupled with the set of transducers guidance assistance logic stored in a memory device of the controller to:
determine a headway direction based on the variable output signal set produced by the set of transducers, the headway direction being representative of a direction (D) to direct the implement in the forward direction (F) to guide the implement along the desired track relative to the furrow; and
generate a headway signal representative of the determined headway direction; and
displaying based on the headway signal by a human interface device operatively coupled with the controller and comprising a human readable display, a guidance image on the human readable display, wherein the guidance image displayed on the human readable display is viewable by an operator of the associated work vehicle, the guidance image displayed on the human readable display comprising a visual representation of the headway signal that is viewable by the operator of the associated work vehicle for assisting the operator visualize the headway signal for steering the associated work vehicle to guide the implement along the desired track relative to the furrow.

18. The automatic guidance assist method according to claim 17, further comprising:
generating in response to the headway signal, a guidance signal on a machine interface device operatively coupled with the controller, the guidance signal being representative of the headway signal and usable to automatically steer the associated work vehicle to move the implement along the desired track relative to the furrow.

* * * * *